United States Patent
Sun et al.

(10) Patent No.: US 10,412,704 B2
(45) Date of Patent: Sep. 10, 2019

(54) ENHANCED DISCONTINUOUS RECEPTION DESIGN FOR A SHARED FREQUENCY BAND

(71) Applicant: QUALCOMM Incorporated, San Diego, CA (US)

(72) Inventors: Jing Sun, San Diego, CA (US); Juan Montojo, San Diego, CA (US); Taesang Yoo, San Diego, CA (US); Siddhartha Mallik, San Diego, CA (US); Andrei Dragos Radulescu, San Diego, CA (US); Chirag Sureshbhai Patel, San Diego, CA (US); Chengjin Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/001,918

(22) Filed: Jun. 6, 2018

(65) Prior Publication Data
US 2018/0288738 A1    Oct. 4, 2018

Related U.S. Application Data

(62) Division of application No. 15/489,599, filed on Apr. 17, 2017, now Pat. No. 10,034,269.

(Continued)

(51) Int. Cl.
*H04W 68/02* (2009.01)
*H04W 72/00* (2009.01)
(Continued)

(52) U.S. Cl.
CPC ........... *H04W 68/02* (2013.01); *H04W 16/14* (2013.01); *H04W 68/005* (2013.01);
(Continued)

(58) Field of Classification Search
None
See application file for complete search history.

(56) References Cited

U.S. PATENT DOCUMENTS

2011/0223942 A1   9/2011  Xu et al.
2014/0200040 A1*  7/2014  Barakat ................ H04W 68/02
                                              455/458

(Continued)

FOREIGN PATENT DOCUMENTS

WO    WO2016163940 A1    10/2016

OTHER PUBLICATIONS

International Search Report and Written Opinion—PCT/US2017/028143—ISA/EPO—dated Jul. 24, 2017.

*Primary Examiner* — Frantz Bataille
(74) *Attorney, Agent, or Firm* — Holland & Hart LLP

(57) ABSTRACT

Methods, systems, and devices for wireless communication are described. A base station may transmit a configuration for enhanced paging to a UE being served by a cell over a shared frequency band. The enhanced paging may include multiple paging intervals for each paging cycle. The UE may enable reception for a paging interval and determine whether the UE receives a downlink transmission. The UE may lengthen a paging interval or enable reception during a second paging interval based in part on determining whether the UE receives a downlink transmission. In some examples, the UE may receive a paging queue status indication indicating that paging information will be transmitted during a paging interval or a later interval, or indicating that no paging information is present at a serving cell.

30 Claims, 20 Drawing Sheets

Related U.S. Application Data

(60) Provisional application No. 62/347,597, filed on Jun. 8, 2016, provisional application No. 62/324,054, filed on Apr. 18, 2016.

(51) Int. Cl.
*H04W 72/04* (2009.01)
*H04W 16/14* (2009.01)
*H04W 68/00* (2009.01)
*H04W 76/28* (2018.01)
H04W 88/02 (2009.01)
H04W 88/08 (2009.01)
H04W 74/08 (2009.01)

(52) U.S. Cl.
CPC ..... *H04W 72/005* (2013.01); *H04W 72/0453* (2013.01); *H04W 76/28* (2018.02); *H04W 74/0808* (2013.01); *H04W 88/02* (2013.01); *H04W 88/08* (2013.01)

(56) References Cited

U.S. PATENT DOCUMENTS

| | | | |
|---|---|---|---|
| 2015/0119088 A1* | 4/2015 | Lee | H04W 68/02 455/458 |
| 2015/0223245 A1* | 8/2015 | Cheng | H04W 48/16 370/329 |
| 2016/0057731 A1 | 2/2016 | Damnjanovic et al. | |
| 2016/0066305 A1* | 3/2016 | Chae | H04J 1/02 370/330 |
| 2016/0234804 A1* | 8/2016 | Hu | H04W 68/02 |
| 2017/0303236 A1 | 10/2017 | Sun et al. | |

\* cited by examiner

ENHANCED DISCONTINUOUS RECEPTION DESIGN FOR A SHARED FREQUENCY BAND

CROSS REFERENCES

The present application for patent is a Divisional of U.S. patent application Ser. No. 15/489,599 by Sun et al., entitled "Enhanced Discontinuous Reception Design For A Shared Frequency Band," filed Apr. 17, 2017, and claims priority to U.S. Provisional Patent Application No. 62/324,054 by Sun et al., entitled "Enhanced Discontinuous Reception Design For A Shared Frequency Band," filed Apr. 18, 2016, and to U.S. Provisional Patent Application No. 62/347,597 by Radulescu et al., entitled "Paging And Power Management For Shared Spectrum," filed Jun. 8, 2016, each of which are assigned to the assignee hereof and expressly incorporated by reference herein for any and all purposes.

BACKGROUND

The following relates generally to wireless communication using a shared frequency band, and more specifically to enhanced discontinuous reception (DRX) design for a contention based shared frequency band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Some wireless systems may operate in shared or unlicensed spectrum where medium access is determined according to contention-based procedures. In some cases, a transmitting device must determine if it can access a channel on a shared spectrum to transmit a downlink transmission that may include a page to a receiving device. In some cases, if the transmitting device cannot access the channel during a set period when the receiving device is awake, the receiving device may go to sleep until a subsequent interval or subsequent set of opportunities and the transmitting device will not be able to deliver the page to the receiving device during the current interval or set of opportunities. A lack of transmission scheduling may complicate communications between devices because there may be imperfect information about whether one device has data queued up for transmission to another device. Current systems rely on techniques that require longer idle time and increased power consumption, which diminishes performance.

SUMMARY

The described techniques relate to improved methods, systems, devices, or apparatuses that support enhanced window DRX design for a shared frequency band. Generally, the described techniques provide for enhanced window design for enabling reception during one or more paging intervals within one or more sets of paging opportunities and for receiving one or more paging activity indications. In some examples, the enhanced window design may include using multiple, shorter paging intervals to enable reception of paging information during a set of paging opportunities.

In some cases, if paging information is received during a first paging interval then a device will exit DRX mode and try to access the system. On the other hand, if a device detected a downlink (DL) transmission during a first paging interval, but did not receive any paging information or paging indications, the device can assume there is no paging for it during the set of paging opportunities and will not enable reception for a subsequent paging interval during the same set of opportunities. The device may monitor for reference signals transmitted during the paging interval to detect a DL transmission. For example, if a device measures a threshold number of reference signals with no paging indication, it may infer that the base station does not have additional paging information. The device may then power down a radio to reduce energy consumption. Alternatively, if a device does not detect a DL transmission or receive paging information via a DL transmission during an earlier paging interval, the device can enable reception during a second paging interval because the base station may not have achieved access to the medium, and may not have had an opportunity to transmit. In some cases, the shared frequency band may include, but is not limited to, environments for enhanced component carrier (eCC) designs. Though the associated methods and techniques may apply to eCC designs, they are not limited to these implementations, and could be used with a number of shared frequency band applications—including long term evolution (LTE), LTE-Advanced (LTE-A), New Radio (NR), or 3G applications.

In some cases, a transmitter device (e.g., a base station) may transmit a paging queue status indication to a subset or all served UEs for a cell. The paging queue status indication may indicate the paging queue status for the cell. For example, a pending paging indication may indicate that additional paging information is in the paging queue while a paging queue empty indication may indicate that no paging information is in the paging queue. In some cases, when a device receives a DL transmission during an earlier paging interval-including receiving a pending paging indication—the device may extend a length of the current paging interval beyond the pre-configured duration to receive paging information. In some cases, based at least in part on receiving a pending paging indication, the device may enable reception during a later paging interval. In some examples, the paging intervals may be discontinuous in time, may be of varying lengths, and different paging intervals may have offsets of time of different length.

In some cases, when a device receives a DL transmission including a paging queue empty indication, the device may determine that no paging information will be transmitted during a specified period (i.e., the current paging interval, a future paging interval of the cycle, a remainder of the set of paging opportunities). Each receiving device may disable reception based on the received paging queue empty indication.

A method of wireless communication is described. The method may include receiving, at a UE served via a cell of a shared frequency band, a configuration for DRX operation on the cell, the configuration including a set of paging opportunities comprising at least a first paging interval, enabling reception for the first paging interval of the set of paging opportunities, detecting whether a downlink transmission on the cell is present during the first paging interval, and determining whether to enable reception for a second paging interval of the set of paging opportunities based at least in part on a result of the detecting.

An apparatus for wireless communication is described. The apparatus may include means for receiving, at a UE served via a cell of a shared frequency band, a configuration for DRX operation on the cell, the configuration including a set of paging opportunities comprising at least a first paging interval, means for enabling reception for the first paging interval of the set of paging opportunities, means for detecting whether a downlink transmission on the cell is present during the first paging interval, and means for determining whether to enable reception for a second paging interval of the set of paging opportunities based at least in part on a result of the detecting.

Another apparatus for wireless communication is described. The apparatus may include a processor, memory in electronic communication with the processor, and instructions stored in the memory. The instructions may be operable to cause the processor to receive, at a UE served via a cell of a shared frequency band, a configuration for DRX operation on the cell, the configuration including a set of paging opportunities comprising at least a first paging interval, enable reception for the first paging interval of the set of paging opportunities, detect whether a downlink transmission on the cell is present during the first paging interval, and determine whether to enable reception for a second paging interval of the set of paging opportunities based at least in part on a result of the detecting.

A non-transitory computer readable medium for wireless communication is described. The non-transitory computer-readable medium may include instructions operable to cause a processor to receive, at a UE served via a cell of a shared frequency band, a configuration for DRX operation on the cell, the configuration including a set of paging opportunities comprising at least a first paging interval, enable reception for the first paging interval of the set of paging opportunities, detect whether a downlink transmission on the cell is present during the first paging interval, and determine whether to enable reception for a second paging interval of the set of paging opportunities based at least in part on a result of the detecting.

In some examples of the method, apparatus, and non-transitory computer-readable medium described above, the detecting comprises: detecting that no downlink transmission may be present on the cell during the first paging interval. Some examples of the method, apparatus, and non-transitory computer-readable medium described above may further include processes, features, means, or instructions for disabling reception at an end of the first paging interval based on the detecting. Some examples of the method, apparatus, and non-transitory computer-readable medium described above may further include processes, features, means, or instructions for enabling reception for the second paging interval based on the detecting.

In some examples of the method, apparatus, and non-transitory computer-readable medium described above, the detecting comprises: detecting that the downlink transmission may be present on the cell during the first paging interval. Some examples of the method, apparatus, and non-transitory computer-readable medium described above may further include processes, features, means, or instructions for detecting whether a paging indication may be present in the downlink transmission during the first paging interval. Some examples of the method, apparatus, and non-transitory computer-readable medium described above may further include processes, features, means, or instructions for disabling reception at an end of the first paging interval based at least in part on detecting that no paging indication for the UE may be present in the downlink transmission during the first paging interval.

In some examples of the method, apparatus, and non-transitory computer-readable medium described above, the first paging interval and the second paging interval overlap.

In some examples of the method, apparatus, and non-transitory computer-readable medium described above, the paging indication comprises a control channel masked with a paging radio network temporary identity (P-RNTI).

In some examples of the method, apparatus, and non-transitory computer-readable medium described above, the disabling may be based at least in part on detecting that the paging indication may be present in a first portion of the first paging interval and then detecting that the paging indication may be absent in a second portion of the first paging interval.

Some examples of the method, apparatus, and non-transitory computer-readable medium described above may further include processes, features, means, or instructions for enabling reception for the second paging interval may be based at least in part on detecting that no downlink transmission on the cell may be present during the first paging interval or detecting that the downlink transmission may be present during the first paging interval and detecting that a paging indication may be present during a portion of the first paging interval.

Some examples of the method, apparatus, and non-transitory computer-readable medium described above may further include processes, features, means, or instructions for disabling reception at an end of the second paging interval based at least in part on detecting that an additional downlink transmission may be present during the second paging interval and detecting that no paging indication may be present during the second paging interval.

In some examples of the method, apparatus, and non-transitory computer-readable medium described above, the downlink transmission comprises a reference signal, a cell-specific reference signal (CRS), a discovery reference signal (DRS), or any combination thereof.

In some examples of the method, apparatus, and non-transitory computer-readable medium described above, the second paging interval may be discontinuous in time from the first paging interval.

Some examples of the method, apparatus, and non-transitory computer-readable medium described above may further include processes, features, means, or instructions for disabling reception for a remainder of the set of paging opportunities based at least in part on detecting that the downlink transmission comprises a paging queue empty indication, wherein the paging queue empty indication indicates that paging information for the UE will not be transmitted during the set of paging opportunities.

In some examples of the method, apparatus, and non-transitory computer-readable medium described above, the disabling reception occurs before an end of the first paging interval.

In some examples of the method, apparatus, and non-transitory computer-readable medium described above, the configuration for DRX operation comprises the second paging interval, and wherein the disabling reception comprises disabling reception for the second paging interval of the set of paging opportunities.

In some examples of the method, apparatus, and non-transitory computer-readable medium described above, paging queue empty indication may be indicated in a physical channel of the downlink transmission, in a physical frame format indication channel (PFFICH), in a physical micro sleep indicator channel (PMSICH), in a physical broadcast channel (PBCH), in a radio resource control (RRC) message, or in a message masked with a radio network temporary identity (RNTI).

In some examples of the method, apparatus, and non-transitory computer-readable medium described above, the paging queue empty indication indicates that no paging information for at least a subset of UEs served by the cell will be transmitted in the set of paging opportunities.

A method of wireless communication is described. The method may include configuring, by a base station serving one or more UEs on a cell via a channel of a shared frequency band, a first UE for DRX operation according to a DRX configuration including at least a first paging interval and a second paging interval for a set of paging opportunities, determining whether paging information for the first UE is pending, determining an ability to transmit a page to the first UE during the first paging interval based at least in part on a channel access procedure for the channel, and transmitting the page on the cell based on the determining the ability to transmit the page to the first UE.

An apparatus for wireless communication is described. The apparatus may include means for configuring, by a base station serving one or more UEs on a cell via a channel of a shared frequency band, a first UE for DRX operation according to a DRX configuration including at least a first paging interval and a second paging interval for a set of paging opportunities, means for determining whether paging information for the first UE is pending, means for determining an ability to transmit a page to the first UE during the first paging interval based at least in part on a channel access procedure for the channel, and means for transmitting the page on the cell based on the determining the ability to transmit the page to the first UE.

Another apparatus for wireless communication is described. The apparatus may include a processor, memory in electronic communication with the processor, and instructions stored in the memory. The instructions may be operable to cause the processor to configure, by a base station serving one or more UEs on a cell via a channel of a shared frequency band, a first UE for DRX operation according to a DRX configuration including at least a first paging interval and a second paging interval for a set of paging opportunities, determine whether paging information for the first UE is pending, determine an ability to transmit a page to the first UE during the first paging interval based at least in part on a channel access procedure for the channel, and transmit the page on the cell based on the determining the ability to transmit the page to the first UE.

A non-transitory computer readable medium for wireless communication is described. The non-transitory computer-readable medium may include instructions operable to cause a processor to configure, by a base station serving one or more UEs on a cell via a channel of a shared frequency band, a first UE for DRX operation according to a DRX configuration including at least a first paging interval and a second paging interval for a set of paging opportunities, determine whether paging information for the first UE is pending, determine an ability to transmit a page to the first UE during the first paging interval based at least in part on a channel access procedure for the channel, and transmit the page on the cell based on the determining the ability to transmit the page to the first UE.

Some examples of the method, apparatus, and non-transitory computer-readable medium described above may further include processes, features, means, or instructions for transmitting the page during the second paging interval based on the channel access procedure determining that the channel may be busy during the first paging interval.

Some examples of the method, apparatus, and non-transitory computer-readable medium described above may further include processes, features, means, or instructions for detecting an interference level of the channel. Some examples of the method, apparatus, and non-transitory computer-readable medium described above may further include processes, features, means, or instructions for adapting at least one of a number of paging intervals or a length of paging interval gaps of the DRX configuration for the first UE based on the detected interference level.

In some examples of the method, apparatus, and non-transitory computer-readable medium described above, the determining whether paging information for the one or more UEs may be pending occurs subsequent to the first paging interval.

In some examples of the method, apparatus, and non-transitory computer-readable medium described above, the transmitting of the page may be during a paging interval of a subsequent set of paging opportunities based at least in part on determining that a downlink transmission was sent via the channel during the first paging interval.

Some examples of the method, apparatus, and non-transitory computer-readable medium described above may further include processes, features, means, or instructions for transmitting a data transmission based on the channel access procedure, the data transmission comprising a paging queue empty indication indicating that no pages may be pending based on a result of the determining whether paging information for the one or more UEs may be pending.

Some examples of the method, apparatus, and non-transitory computer-readable medium described above may further include processes, features, means, or instructions for determining a resource for the paging queue empty indication based on a mask function or a hash function of identifiers associated with the one or more UEs.

In some examples of the method, apparatus, and non-transitory computer-readable medium described above, the paging queue empty indication may be indicated in a physical channel of the downlink transmission, in a PFFICH, in a PMSICH, in a PBCH, in a RRC message, in a message masked with a RNTI, or any combination thereof.

In some examples of the method, apparatus, and non-transitory computer-readable medium described above, the downlink transmission comprises a reference signal, a CRS, a DRS, or any combination thereof.

DETAILED DESCRIPTION

Figure 1:
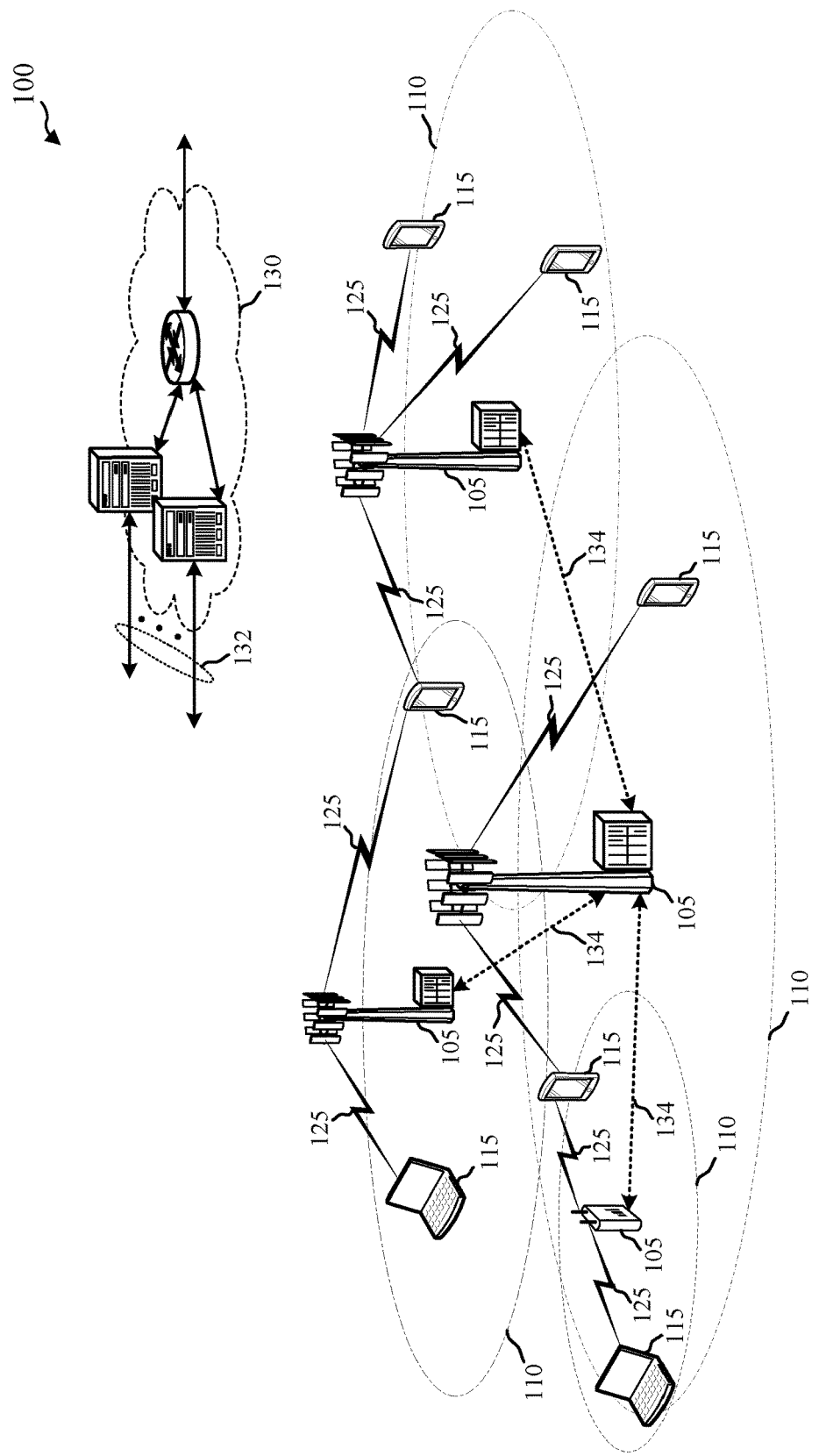
FIG. 1 illustrates an example of a wireless communications system that supports enhanced DRX design for a shared frequency band in accordance with aspects of the present disclosure.

The described techniques provide an enhanced window design for enabling reception during multiple paging intervals and for receiving one or more paging queue status indications for enhanced paging over a shared frequency band. In some examples, the enhanced window design may include using multiple or extended paging intervals to enable reception of paging information during a set of paging opportunities. In some cases, enabling reception for a later paging interval during a set of paging opportunities is dependent on transmissions and/or paging queue status indications in prior paging intervals of the set of paging opportunities. In some cases, the shared frequency band may include, but is not limited to, environments employing eCC designs. Though the associated methods and techniques may apply to eCC designs, they are not limited to these implementations, and could be used with a number of shared frequency band applications-including LTE, LTE-A, Multe-Fire, NR, or 3G applications. A shared radio frequency spectrum band may be, for example, an unlicensed radio frequency spectrum band, a licensed radio frequency spectrum band having more than one licensed operator, or a licensed radio frequency spectrum band providing for opportunistic sharing of resources of the licensed radio frequency spectrum band.

Paging queue status indications may include a pending paging indication or paging queue empty indication. A pending paging indication may indicate to a device to extend a length of the current paging interval beyond the preconfigured duration to receive paging information. Additionally or alternatively, after receiving a pending paging indication, the device may enable reception during a later paging interval (e.g., even where a transmission is detected in the earlier interval). In some examples, the paging intervals may be discontinuous in time, may be of varying lengths, and different paging intervals may have offsets of time of differing length.

In some cases, a base station may identify that a page is present for a UE after a first paging interval and before a second paging interval. Here, the base station may reference a transmission history or determine whether the base station transmitted a DL transmission during the first paging interval. Doing so allows the base station to determine if the receiving device will enable reception during the second paging interval-facilitating the base station transmitting the paging to the device during the second paging interval.

In some cases, if the base station transmitted to the UE during the first paging interval, then the UE will not enable reception during the second paging interval and the base station may not transmit the page to the UE during the second paging interval, but may instead attempt to transmit the page during a next set of paging opportunities (e.g., during a first paging interval of the next set of paging opportunities).

In other examples, a base station may transmit a paging queue empty indication to UEs served by a cell, where the paging queue empty indication indicates no paging information is pending for transmission from the cell. Each UE may then disable reception (e.g., for a remainder of a paging interval or set of paging opportunities) based on the received paging queue empty indication. In some cases, a UE may truncate a current paging interval based on a received paging queue empty indication.

In some cases, the paging queue empty indication may be broadcast to be received by all served UEs, or may be hashed for reception by a subset of served UEs, in some cases. As one example, in some cases it may be desirable to maintain multiple paging queues and have each UE on the cell hashed into one of the queues, with a paging queue status indication corresponding to each queue. If a page is pending for a UE in one queue, the base station may send a pending paging indication for that queue-notifying the UEs hashed to this queue to continue to enable reception (e.g., until an end of a transmission, for a next paging interval, until an end of the set of paging opportunities, etc.). Alternatively, if no page is pending for any UE in a queue, the base station may send a paging queue empty indication for that queue-notifying the UEs hashed to this queue to disable reception (e.g., at an end of a transmission, for a next paging interval, until an end of the set of paging opportunities, etc.).

Aspects of the disclosure are initially described in the context of a wireless communication system. One example involving communication and related operations between a first device (e.g., a base station) and a second device (e.g., a UE) is described. Examples relating to enhanced window DRX design for devices served via a cell over a channel of a shared frequency band are also described. Examples of enhanced DRX design involving paging queue status indications are also described. Other examples relate to process flows for systems that support enhanced DRX design for a shared frequency band. Aspects of the disclosure are further illustrated by and described with reference to apparatus diagrams, diagrams, and flowcharts that relate to enhanced DRX design for a shared frequency band.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE, LTE-A, or NR network. In some examples, aspects of the wireless communications system 100 may operate in accordance with an enhanced DRX design that may include using multiple paging intervals to enable reception of paging information during a set of paging opportunities on a shared frequency band.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a UE 115 may monitor a communication link 125 continuously for an indication that the UE 115 may receive data. In other cases (e.g., to conserve power and extend battery life) a UE 115 may be configured with a DRX cycle. A DRX cycle consists of an "On Duration" when the UE 115 may be awake to monitor for control information (e.g., on PDCCH) and a "DRX period" when the UE 115 may power down radio components (e.g., a DRX mode or a sleep state). In some cases, DRX can be used in an idle mode or a connected mode. In some, based on a connected DRX a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on physical downlink control channel (PDCCH) during the On Duration. While monitoring PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

A UE 115 may enter an idle mode and wake up to receive paging messages in certain subframes (e.g., paging occasions of a DRX cycle). If the serving gateway (S-GW) receives data for the UE 115, it may notify the mobility management entity (MME), which may send a message indicating the page to every base station 105 within an area known as a tracking area. Each base station 105 within the tracking area may send a paging message for the UE. The UE may detect the paging message by decoding messages in a search space according to a P-RNTI. Thus, the UE may remain in idle without updating the MME until it leaves the tracking area.

In some cases, wireless communications system 100 may utilize eCCs. An eCC may be characterized by one or more features including: wider bandwidth, shorter symbol duration, shorter transmission time intervals (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A transmission time interval (TTI) for an eCC may consist of one or multiple symbols. In some cases, the TTI duration (that is, the number of symbols in a TTI) may be variable.

In an LTE or LTE-Advanced (LTE-A) network, a base station and a UE may communicate over dedicated frequency spectrum that is licensed to the network operator. A licensed operator network (e.g., cellular network, etc.) may be known as a public land mobile network (PLMN). With increasing data traffic in cellular networks that use dedicated (e.g., licensed) radio frequency bands, offloading at least some data traffic to shared (e.g., unlicensed) radio frequency spectrum may enhance data transmission capacity and efficient use of resources. Shared radio frequency spectrum may also provide service in areas where access to a dedicated radio frequency spectrum is unavailable. Unlicensed radio frequency spectrum generally refers to spectrum available for use without a license and is typically subject to technical rules regarding access and transmit power. As used herein, shared radio frequency spectrum refers to spectrum that is allocated for unlicensed, shared, or opportunistic use according to contention-based access procedures.

A listen before talk (LBT) procedure may be used for contention resolution for access to channels of shared radio frequency spectrum without pre-coordinated resource allocation. An LBT procedure may include performing a clear channel assessment (CCA) procedure to determine whether a shared channel is available. When it is determined that the shared channel is available, a device may transmit a signal to reserve the channel before data transmissions. Other devices may monitor for the reservation signal to detect transmissions, and may also monitor the shared channel using energy detection to determine whether the shared channel is busy or free.

Operation using LTE signal waveforms over the shared radio frequency spectrum may be called LTE-Unlicensed (LTE-U) operation, and an LTE device supporting LTE-U operation may be called an LTE-U device. Operation using LTE/LTE-A carriers in unlicensed or shared frequency spectrum may be used in a standalone operation mode where an LTE/LTE-A carrier can be used as a primary cell for a UE.

The LTE/LTE-A carrier may also be used in a licensed assisted access (LAA) mode where a UE is configured with an LTE/LTE-A cell in licensed spectrum as a primary cell and one or more secondary cells in unlicensed or shared frequency spectrum in a carrier aggregation mode.

Where a base station serves a UE over a cell in a shared radio frequency spectrum band (e.g., in a standalone mode), channel access for paging may be subject to LBT. Allocation of a single paging occasion (e.g., a single subframe or TTI) in a set of paging opportunities may provide few opportunities for the UE to be paged when a channel is being shared with other devices. For UEs served by a cell in a shared radio frequency spectrum band in a standalone mode, paging intervals can be used. In some cases, a paging interval may be based on one or more characteristics of a TTI. In some cases, a paging interval may have a length at least as long as the longest TTI length in transmissions over the cell to enable reception of the information. Increasing the length of the paging interval may provide increased opportunities for paging. However, increasing the length of the interval increases power consumption. Thus, reliable paging in channels subject to LBT channel access procedures may provide challenges.

Aspects of the disclosure are directed to techniques and devices for enhanced paging via a cell in a shared radio frequency band. The techniques include enhanced configurations for paging (e.g., DRX configuration) including multiple and/or extended paging intervals. If a device does not receive paging information during a paging interval of a set of paging opportunities, the device can open additional intervals of the set of paging opportunities. In some examples, the multiple paging intervals may be discontinuous in time, may be of varying lengths, and different paging intervals may have offsets of time of differing length. In some cases, when a device detects a DL transmission during a paging interval the device may extend a length of time it remains in an awake state beyond the pre-configured duration of the interval. In other examples, a transmitter device may transmit a paging queue status indication to at least some or all receiving devices on a cell. A paging queue status indication may indicate that no paging information (e.g., paging queue empty indication) is present for a subset or all UEs served by a cell, or that additional paging information is present that is not carried in a transmission or TTI of a transmission. UEs served by the cell may make adjustments or perform operations based on the paging queue status indications.

In some cases, the length of paging intervals and the length of offsets between paging intervals may be determined or calculated based on a formula that accounts for various parameters or to enable a consistent design across different carriers, implementations, and device. In some cases, this formula may include: calculating a length of a paging interval or an offset based on a length of an earlier paging interval or offset, calculating a length of a paging interval or an offset based on a fixed relationship between the earlier paging interval or offset and the later paging interval or offset (i.e., a later interval may be twice as long as an earlier interval), calculating a length of a paging interval or an offset based on a relationship of multiple paging intervals or offset within a set of paging opportunities (i.e., the length may be based on an exponential relationship), some combination, or other mathematical relationships or process-based determinations.

Figure 2:
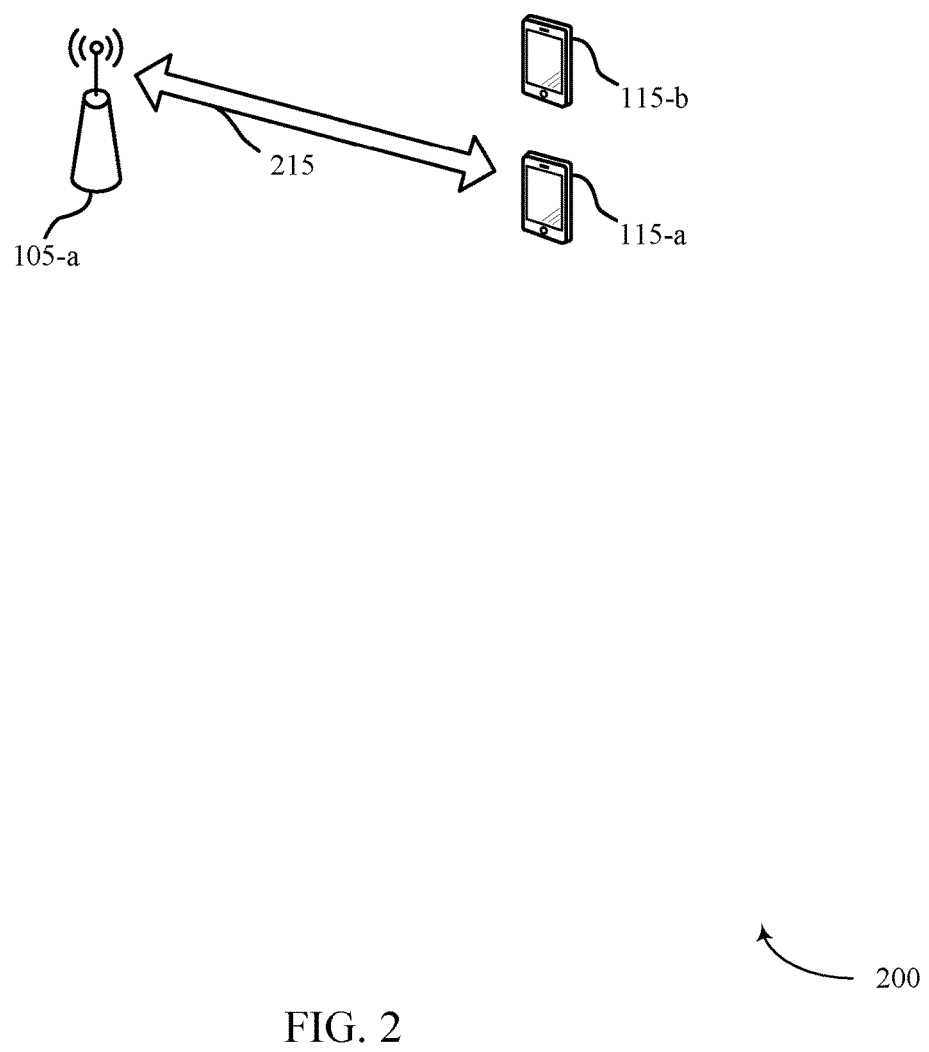
FIG. 2 illustrates an example of a wireless communications system 200 for enhanced DRX design for a shared frequency band in accordance with aspects of the present disclosure.

FIG. 2 illustrates an example of a wireless communications system 200 for enhanced DRX design for a shared frequency band. Wireless communications system 200 may include base station 105-*a*, and UE 115-*a* and UE 115-*b*, which may be examples of the corresponding devices described with reference to FIG. 1. Wireless communications system 200 may represent a system that supports enhanced paging using multiple paging intervals within a set of paging opportunities. Wireless communications system 200 may also represent a system that supports using various paging queue status indications, including a pending paging indication and a paging queue empty indication. In some examples, the multiple or extended interval design and designs incorporating one or more paging queue status indications may enable more efficient paging communication between a base station and at least one UE.

In some cases, base station 105-*a* may perform a channel access procedure (e.g., an LBT procedure) to determine whether it can reserve the channel for a DL transmission 215 to one or more UEs on the cell. Thus, if a page for UE 115-*a* is present in a page queue at base station 105-*a*, transmission of the page may be subject to the channel access procedure. Base station 105-*a* may perform the channel access procedure before or during a paging interval configured for UE 115-*a* to transmit the page. If the channel is busy (e.g., due to other devices actively transmitting over the channel), the base station 105-*a* may have to wait until the next set of paging opportunities to attempt to reserve the channel again.

As one example, if base station 105-*a* gains access to the channel before or during the paging interval, base station 105-*a* may transmit the page in one of the TTIs within the paging interval. In some examples, base station 105-*a* may determine whether it can gain access to a channel of a shared frequency band before or during a first paging interval of a set of paging opportunities. If base station 105-*a* cannot gain access to a channel before or during a first paging interval, base station 105-*a* may transmit a page during a second paging interval. In some cases, based on determining that base station 105-*a* may gain access to the channel, base station 105-*a* may reserve a channel to communicate with one or more other devices (i.e., a UE) on the cell. Based on reserving the channel, base station 105-*a* may transmit DL transmission 215 that may be intended for a first UE, a subset of UEs, or each UE served by cell.

In some cases, UEs 115-*a* and 115-*b* may be in an idle mode and configured for receiving paging (e.g., according to an enhanced DRX configuration) from base station 105-*a*. In some cases, UEs 115-*a* and 115-*b* may be configured for operation using multiple paging intervals, where opening of paging intervals within a set of paging opportunities may be dependent on detection of transmission in earlier paging intervals. For example, UE 115-*b* may be configured so that if it detects a DL transmission 215 on the cell during a paging interval, then UE 115-*b* may disable reception at an end of the paging interval regardless of whether any paging information was received by UE 115-*b*. In other cases, UE 115-*b* may continue to monitor for paging past the configured end of the paging interval if DL transmission 215 on the cell is detected within the paging interval. In some cases, UEs 115-*a* and UE 115-*b* may detect paging queue status indications (i.e., pending paging indication, paging queue empty indication) transmitted in DL transmission 215. The paging queue empty indication may inform a subset or all UEs served by the cell that no paging information is pending at the base station 105-*a*. Based on this information, each UE on the cell may disable reception for a time period (e.g., a remainder of a set of paging opportunities, later paging intervals of a set of paging opportunities, etc.).

Figure 3A:
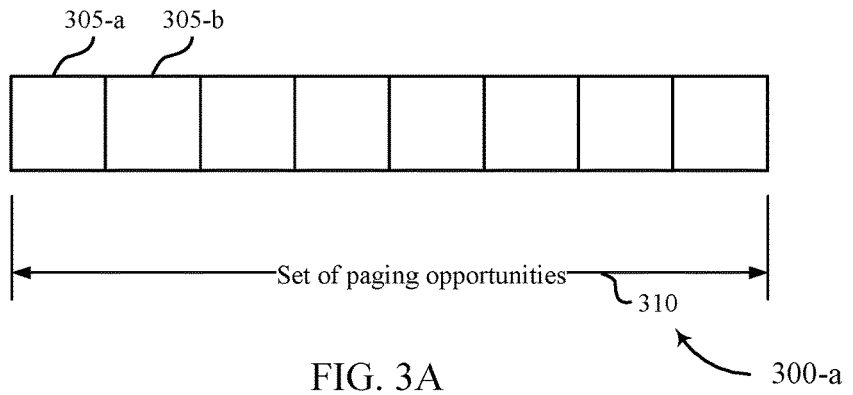
FIGS. 3A through 3C illustrate examples of a timing diagram that supports enhanced DRX design for a shared frequency band in accordance with aspects of the present disclosure.
Figure 3B:
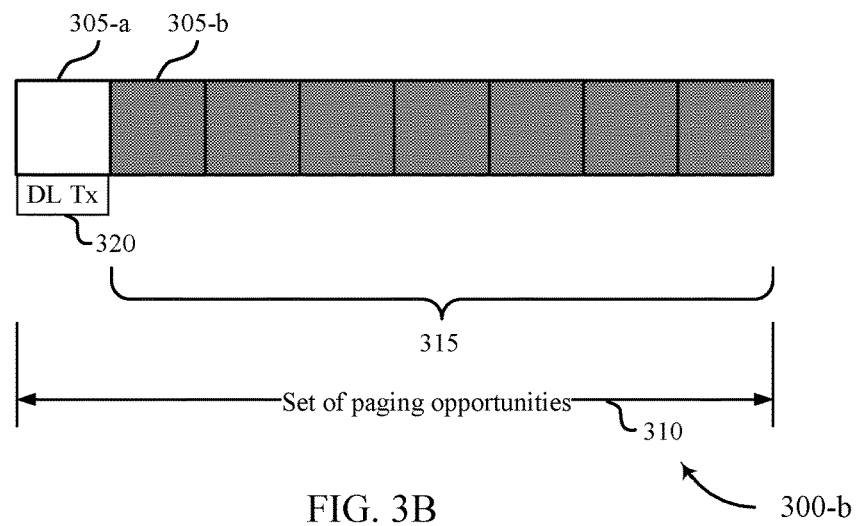
Figure 3C:
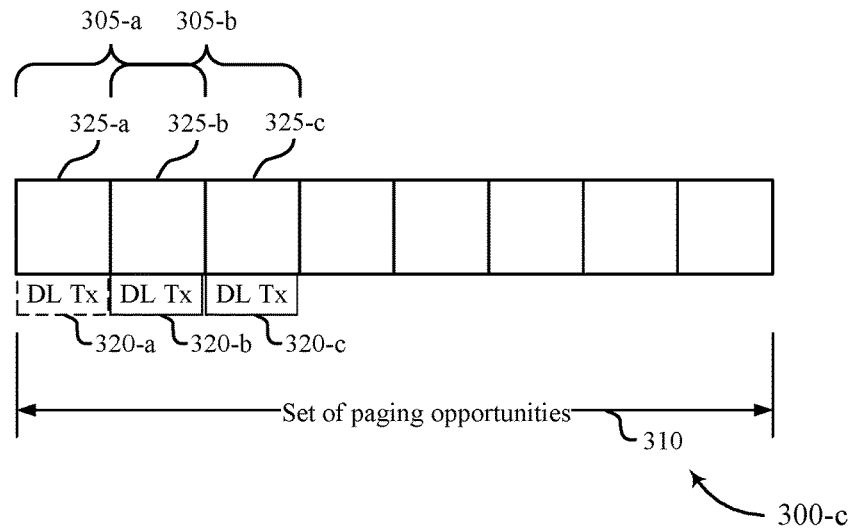

FIGS. 3A-3C illustrate timing diagrams 300-*a*, 300-*b*, and 300-*c* depicting examples of enhanced DRX paging for a shared frequency band. In some cases, timing diagrams 300-*a*, 300-*b*, and 300-*c* may represent aspects of techniques performed by UEs 115 or base stations 105 as described with reference to FIGS. 1-2.

In some examples, a UE served via a cell supporting a shared radio frequency spectrum band may receive a configuration for DRX operation on the cell. The configuration may include an enhanced DRX configuration including multiple paging intervals. This configuration may include at least a first paging interval 305-*a* and a second paging interval 305-*b* as part of a set of paging opportunities 310. Other paging intervals may also be configured. In some cases, the enhanced DRX configuration may be updated based on parameters detected or determined for the channel (e.g., interference level, number of served UEs, etc.). FIGS. 3A-3C show one set of paging opportunities 310, which may be a subset of TTIs of a paging cycle. The paging cycle may be repeated by a UE while in an idle mode until a page for the UE is detected, upon which the UE may enter a connected mode (e.g., via a random access procedure, etc.).

As shown in FIG. 3A, a set of paging opportunities 310 may be configured to include at least a first paging interval 305-*a* and may optionally include one or more subsequent paging intervals, such as a second paging interval 305-*b*. The set of paging opportunities may be known as a paging opportunity window (POW). The paging opportunity window may be based on a particular equation that accounts for a specific UE identifier (UE_ID) or a discontinuous reception (DRX) timing (T_DRX), or both. For instance, a system frame number (SFN) and/or subframe in which the paging information may be transmitted may be based on the equation SFN(mod $T_{DRX}$)=$T_{DRX}$/N*$UE_{ID}$(mod N), where N=min ($T_{DRX}$, nB). An offset of the set of paging opportunities within a paging cycle may be different (e.g., randomized) for different UEs, and may be randomized across base stations to reduce the frequency of back-off among neighboring base stations.

A paging interval may include one or more TTIs, and in eCC a TTI may consist of one or multiple symbols. In some cases, the TTI duration (that is, the number of symbols in a TTI) may be variable. Depending on whether a DL transmission on the cell is detected during a first paging interval 305-*a*, the UE may determine whether to enable reception for a second paging interval 305-*b* of the first set of paging opportunities 310. For example, if no DL transmission on the cell is detected during the first paging interval 305-*a*, the UE may determine to enable reception for the second paging interval 305-*b*. Additionally, where the UE does not detect a DL transmission on the cell during the second paging interval 305-*b*, the UE may enable reception during a subsequent paging interval. The DL transmission may be detected by detecting the presence of reference signals (e.g., CRS, DRS, etc.) associated with the cell.

A base station may check channel access (e.g., perform an LBT procedure) and/or paging channel capacity for the cell. In some examples, the base station may not be able to gain access to the channel for the cell in the first paging interval 305-*a*. In such case, the base station may determine the next paging interval for the UE. If the base station does gain access to the channel for a transmission over the cell in the second paging interval 305-*b*, the base station may transmit the page in the second paging interval 305-*b*. In certain circumstances the base station may gain access to the channel but may not include the page in the transmission (e.g., due to paging channel capacity constraints or paging/data priority, etc.). In this case, the base station may transmit a pending paging indication so that the UE extends the current paging interval or enables reception for the next paging interval of the set of paging opportunities to receive the page.

As shown in FIG. 3B, depending on whether a DL transmission 320 on the cell is detected during a first paging interval 305-*a*, the UE may determine whether to disable reception for the remainder of unused TTIs 315 of the first set of paging opportunities 310. For example, if a DL transmission 320 on the cell is detected during the first paging interval 305-*a*, the UE may detect if a paging indication is present in the DL transmission 320 to determine to disable reception for the remainder of unused TTIs 315 of the first set of paging opportunities 310. For example, where the UE detects a DL transmission 320 on the cell that does not include any paging indications, includes fewer than a predetermined number (e.g., 16, etc.) of pages for other UEs, during the first paging interval 305-*a*, the UE may disable reception for the remainder of unused TTIs 315 of the first set of paging opportunities 310. Where the DL transmission 320 includes a page for the UE, the UE may enter a connected mode (e.g., via a random access procedure, etc.).

In another example, if the UE detects a DL transmission 320 on the cell that includes a paging queue empty indication, the UE may disable reception for the remainder of unused TTIs 315 of the first set of paging opportunities 310. In some cases, the paging queue empty indication may indicate that no further paging information for the UE will be transmitted during the set of paging opportunities. Additionally or alternatively, the paging queue empty indication may indicate that no further UEs will be paged in the first set of paging opportunities 310. A paging queue empty indication may be communicated to the one or more UEs, for example, using a physical channel of the downlink transmission, in a RRC message, or in a message masked with a RNTI. Examples of physical channels for carrying the paging queue empty indication include a PFFICH, a PMSICH, or a PBCH. A paging queue empty indication may also be identified by a specially coded control message such as a control message encoded with a particular RNTI (e.g., predetermined RNTI to indicate the paging queue empty indication), or P-RNTI encoded control message with an empty allocation.

In another example, the UE may detect a DL transmission 320 on the cell that includes a pending paging indication. The pending paging indication may indicate that additional paging information is in the paging queue, but that the paging information for the UE will not be transmitted during the current set of paging opportunities 310. Based at least in part on the pending paging indication, the UE may initiate one or more actions such as altering the current paging interval or altering whether the UE opens additional paging intervals during the current set of paging opportunities. A pending paging indication may be communicated to the one or more UEs, for example, using a physical channel of the downlink transmission, in a PFFICH, PMSICH, PBCH, RRC message, or in a message masked with a RNTI.

As shown in FIG. 3C, a first paging interval 305-*a* may overlap with a second paging interval 305-*b* within the set of paging opportunities. The first paging interval 305-*a* may include, for example, TTIs 325-*a* and 325-*b*. The second paging interval may include TTIs 325-*b* and 325-*c*. In some cases, depending on whether a DL transmission 320-*a* on the cell is detected during TTI 325-*a* of the first paging interval 305-*a*, the UE may determine whether to enable reception for a second paging interval 305-*b* of the first set of paging opportunities 310. In some examples, if the UE does not detect a DL transmission on the cell during the first TTI 325-*a* but does detect a DL transmission 320-*b* on the cell during the second TTI 325-*b*, the UE may enable reception during the second paging interval 305-*b*. Accordingly, the first and second paging intervals 305-*a* and 305-*b* may overlap to allow a given number of TTIs (e.g., two TTIs as shown) to be observed after the UE detects a first DL transmission (e.g., TTI 325-*b* as shown). The UE may monitor for one of several conditions to determine whether to open up additional paging intervals (up to the set of paging opportunities 310). For example, the UE may monitor for a DL transmission or an indication of paging. When a DL transmission is detected and the given number of TTIs of the paging interval duration are observed without a paging message (control message masked with P-RNTI), the UE may disable reception for the additional paging intervals of the set of paging opportunities 310.

Figure 4:
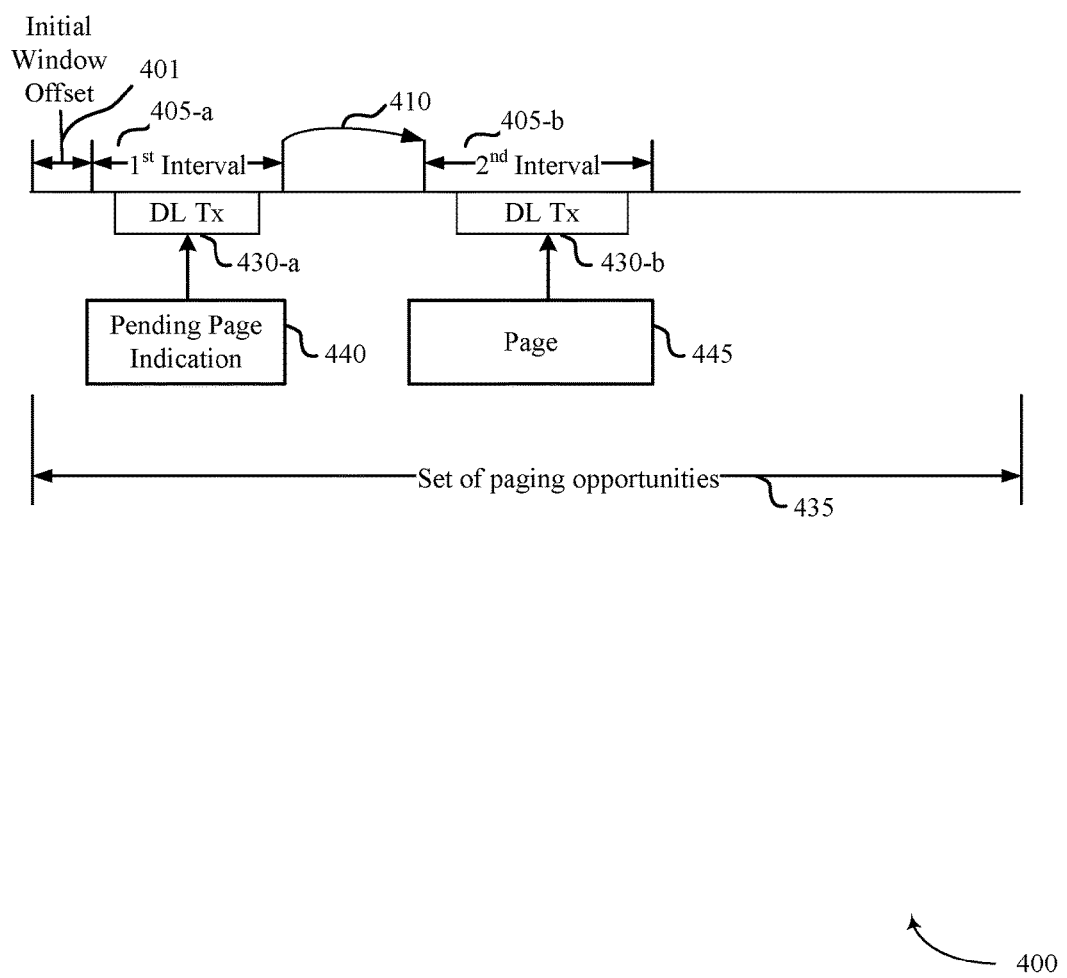
FIG. 4 illustrates an example of a timing diagram that supports enhanced DRX design for a shared frequency band in accordance with aspects of the present disclosure.

FIG. 4 illustrates a timing diagram 400 depicting examples of enhanced DRX paging for a shared frequency band. In some cases, timing diagram 400 may represent aspects of techniques performed by UEs 115 or base stations 105 as described with reference to FIGS. 1-2.

In some examples, a UE served via a cell of a shared radio frequency spectrum band may receive a configuration for DRX operation on the cell. In some examples, the configuration may include an enhanced DRX configuration including multiple paging intervals. This configuration may include at least a first paging interval 405-*a* and a second paging interval 405-*b*, which may represent aspects of the paging intervals described in FIG. 3. In some examples, other paging intervals (e.g., intervals 3 or 4 (not shown), etc.) may also be included. In some cases, the enhanced DRX configuration may be updated based on parameters detected or determined for the channel (e.g., interference level, number of served UEs, etc.). FIG. 4 shows one set of paging opportunities 435, which may be repeated by a UE while in an idle mode until a page for the UE is detected, upon which the UE may enter a connected mode (e.g., via a random access procedure, etc.).

As shown in FIG. 4, depending on whether a DL transmission on the cell is detected during a first paging interval 405-*a*, the UE may determine whether to enable reception for a second paging interval 405-*b* of the first set of paging opportunities 435. For example, if no DL transmission on the cell is detected during the first paging interval 405-*a*, the UE may determine to enable reception for the second paging interval 405-*b*. Additionally, where the UE does not detect a DL transmission on the cell during the second paging interval 405-*b*, the UE may enable reception during a third paging interval.

Paging intervals for the UE may be configured in a variety of manners. For example, parameters that may be used for configuration of multiple paging intervals within a set of paging opportunities include the length of the set of paging opportunities, initial interval offset 401, number of configured paging intervals, lengths for each configured paging interval, offsets for each configured paging interval, paging interval duration factor (factor for length of interval N based on interval N–1), paging interval offset factor (factor for length of offset N based on offset N–1), maximum number of paging intervals, and the like. Values for some of the parameters (e.g., length of the set of paging opportunities, paging interval lengths, paging offsets, etc.) may be broadcast (e.g., as default values), and a UE or base station may override the broadcast values (e.g., via RRC signaling, etc.).

Some parameters may be UE specific (e.g., initial interval offset 401) and may be determined as a function (e.g., hashing) of a UE identifier. For example, a pseudo-random number may provide a designed offset for a first UE that sets a time for a first paging interval. In some cases, different UEs may be hashed or masked to different initial paging intervals, and in turn the different UEs may also have different later paging intervals based on the masking or the hashing. In some cases, this designed offset differentiates the first UE from other UEs on the cell, and may allow for spreading of paging intervals and other parameters across time.

The base station may adapt the paging interval parameters based on channel conditions or other factors. For example, as a channel gets busier (e.g., more interference) or more UEs are served by a cell, the base station may configure additional intervals, adjust interval durations and offsets, and the like.

Figure 5:
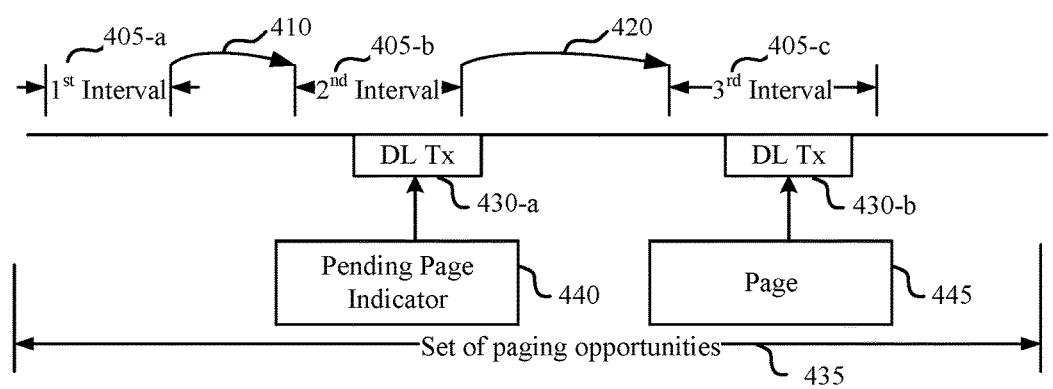
FIG. 5 illustrates an example of a timing diagram that supports enhanced DRX design for a shared frequency band in accordance with aspects of the present disclosure.

FIG. 5 illustrates a timing diagram 500 depicting examples of enhanced paging for a shared frequency band. In some cases, timing diagram 500 may represent aspects of techniques performed by UEs 115 or base stations 105 as described with reference to FIGS. 1-2. In some examples, timing diagram 500 may be used in a system that supports using various paging queue status indications, including a pending paging indication. In some examples, a UE served via a cell of a shared frequency band may receive a configuration for DRX operation on the cell. This configuration may include multiple intervals within each paging interval. In some examples, an enhanced window configuration may include at least a first paging interval 405-*a* and a second paging interval 405-*b*.

As shown in FIG. 5, the UE may enable reception during a first paging interval 405-*a*, detect whether a DL transmission is present during this interval, and disable reception at an end of the first paging interval 405-*a*. Based at least in part on detecting whether a DL transmission is present or occurs during a first paging interval 405-*a*, the UE may enable reception for the second paging interval 405-*b*. In some examples, the UE may detect the DL transmission 430-*a* on the cell during the second paging interval, but the DL transmission 430-*a* may not include a page for the UE. As discussed above, when the UE receives a DL transmission 430-*a* on the cell that does not include a page for the UE, the UE may not open any additional paging intervals during the current set of paging opportunities 435-*a*. Thus, the next paging opportunity may be in the next set of paging opportunities.

However, in this case the base station may have a pending page for the UE but may not have capacity in the DL transmission (e.g., based on transmission priority or other factors) for the page. In this case, the base station may transmit a pending paging indication 440 to the UE even when it does not transmit a page during the DL transmission 430-*a*. This provides an advantage when the base station's paging channel capacity will not permit transmitting a page, if interference exists, or based on other problems or circumstances. Instead, the pending paging indication 440 may indicate that at least one additional page is queued at the base station. Based at least in part on the pending paging indication 440, the UE may initiate one or more actions such as altering the current paging interval or altering whether the UE opens additional paging intervals during the current set of paging opportunities 435-*a*. As one example, the UE may extend one or more paging intervals in the current set of paging opportunities 435-*a*. In some cases, the UE may extend the paging interval in which the pending paging indication 440 is received. In some examples, the pending paging indication 440 may be included in multiple TTIs of DL transmission 430-*a*. In this case, the UE may extend a current paging interval until a TTI is detected without the pending paging indication 440.

Additionally or alternatively, the UE may open additional paging intervals of the current set of paging opportunities 435-a. As shown in FIG. 5, for example, the UE may enable reception during a third paging interval 405-c during the current set of paging opportunities 435-a despite the UE detecting the DL transmission 430-a without a page for the UE during the second paging interval 405-b. In some examples, after receiving a pending paging indication 440, the UE may enable reception during at least one later paging interval (e.g., third paging interval 405-c) based on at least in part on the pending paging indication 440. In some examples, as further shown in FIG. 5, based on the enabled reception during a later paging interval (e.g., third paging interval 405-c), the UE may receive a page 445 transmitted by the base station during a second DL transmission 430-b. The UE may then connect to the base station via the cell based on receiving the page.

In some examples, a length of a first paging interval 405-a may differ from a length of a second paging interval 405-b. For example, the second paging interval 405-b may be longer than the first paging interval 405-a. As shown in FIG. 5, each paging interval may be non-decreasing when compared to at least one earlier interval or each earlier interval. In some examples, a first offset 410 between the first paging interval 405-a and the second paging interval 405-b may be different from a second offset 420 between the second paging interval 405-b and a third paging interval 405-c. For example, the second offset 420 may be longer than the first offset 410. Among other reasons, having differing offsets between various paging intervals may provide an advantage when interference exists. As one example, if the channel is experiencing a high level of use by other transmitters, extending the length of additional intervals or offsets between intervals may decrease the likelihood that interference will still be present during the next interval.

In addition, extending the length of each successive paging interval or offset between intervals may enable the base station to transmit paging information that has built up over time, including when the base station is unable to transmit at least some paging information during a first interval. The UE may receive and detect a DL transmission 430 using a third paging interval 405-c. In some cases, the DL transmission 430 may begin before the UE enabled reception for the third paging interval 405-c. Alternatively, the DL transmission may begin at a beginning or during the third paging interval 405-c. In some examples, when the UE detects a DL transmission 430 but does not receive paging information on the cell, the UE may disable reception for any remaining paging intervals during the current set of paging opportunities to conserve resources. For example, if the UE detects DL transmission 430 during the third paging interval 405-c, but does not detect any paging information for itself-despite the apparent ability of the base station to transmit the paging information during an interval configured for the UE—the UE may determine that no relevant paging information will be transmitted during this first set of paging opportunities 435.

Figure 6:
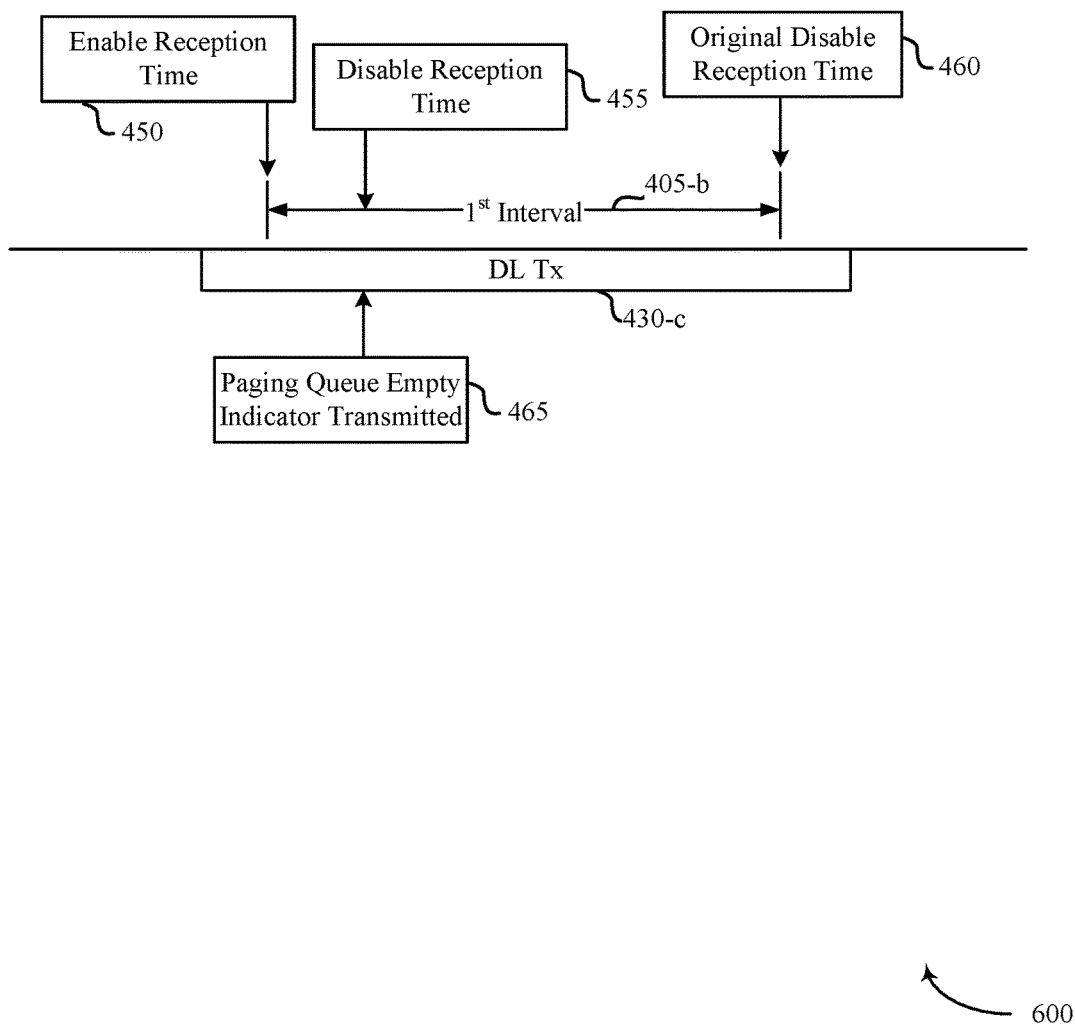
FIG. 6 illustrates an example of a timing diagram that supports enhanced DRX design in accordance with aspects of the present disclosure.

FIG. 6 illustrates a timing diagram 600 depicting examples of paging interval concepts for DRX operation on a cell. In some cases, timing diagram 600 depicts examples of a paging interval that may represent aspects of techniques performed by UEs 115 or base station 105 as described with reference to FIGS. 1-2. In some examples, timing diagram 600 may be used in a system that supports using various paging queue status indications, including a paging queue empty indication. In some cases, timing diagram 600 may be used independent of or in conjunction with an enhanced window configuration.

In some examples, a UE served via a cell of a shared or a non-shared frequency band, may receive a configuration for paging operation on the cell. This configuration may configure a set of paging opportunities and include a paging interval 405 having a first configured length. In some cases, the UE (e.g., the first UE) may enable reception at a first time 450. In some cases, the UE may enable reception at a beginning of the first paging interval. After waking up, the UE may receive a DL transmission 430 from a base station. In some cases, the DL transmission 430-c may be intended for the first UE, multiple UEs, or each UE within the cell. In some examples, the UE may detect one or more DL transmissions 430-c that are at least partially received during the first paging interval 405-b. In some cases, at least one DL transmission 430-c may begin before a beginning of the first paging interval 405-b, as shown in FIG. 6. In other cases, at least one DL transmission 430-c may begin during, but after the beginning of the first paging interval.

At a second time, the UE may receive paging information that includes a paging queue empty indication 465. In some cases, this paging queue empty indication 465 may indicate that the base station does not have pending paging information for the UE (or a subset of UEs, or any UEs served by the cell). As shown in FIG. 6, the UE may disable reception at a time 455 during the paging interval 405-b based on receiving the paging queue empty indication 465. In some cases, the UE may alter a length of the first paging interval 405-b in which the paging queue empty indication 465 was received. For example, the UE may disable reception (e.g., enter a sleep mode) at a time 455 during the first paging interval 405-b (e.g., immediately after receiving the paging queue empty indication 465). In some examples, the UE may suppress one or more later paging intervals of the same set of paging opportunities. In the case where the UE receives a paging queue empty indication at a time during the first paging interval, the UE may disable reception for a second paging interval of the first set of paging opportunities.

In some examples, the paging queue empty indication may be transmitted by the base station and received by the UE in a physical channel of one or more DL transmissions (e.g., a PFFICH, a PMSICH, a PBCH, etc.). The paging queue empty indication may indicate that the cell does not have pending pages for UEs served by the cell or UEs that receive the indication. In some cases, a paging queue empty indication may include information directed to a subset of the UEs served by the cell via hashing in frequency or in time, bits received in particular locations in a physical channel, a DCI message, or another method. As one example, a base station may have multiple pages in a queue to transmit to a first subset of the UEs on a cell (e.g., UE0, UE1). The base station may define a hash function (e.g., UE ID mod 5). that will trigger the UEs to hash to a value (i.e., UE0 hashes to 0, UE1 hashes to 1, UE6 hashes to 1). The base station may then send a paging queue empty indication for each hashed value for which no associated UE has a pending page. For example, the base station can send paging in activity indications to UEs hashed to other values (e.g., 2, 3, 4). These paging queue status indications will not cause UE0 and UE1 to miss the pages intended for them, while allowing a second subset of UEs to conserve power by disabling reception (e.g., entering a DRX sleep state) for the rest of their sets of paging opportunities or paging intervals. In some cases, using a level 1 control channel may include, but is not limited to, using one bit in a level 1 control channel that is joint coded with a PMSICH, among other techniques and methods.

Figure 7:
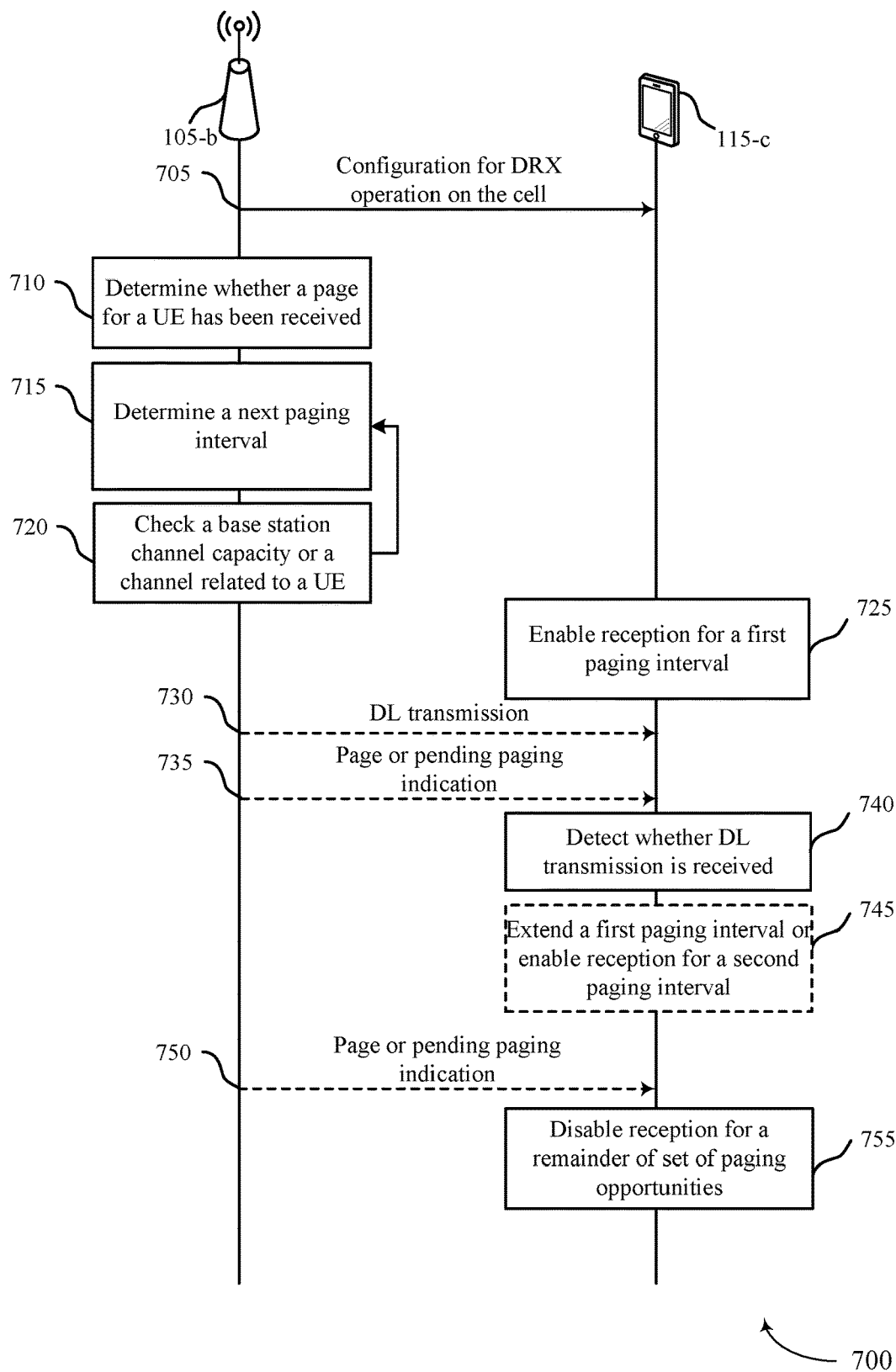
FIG. 7 illustrates an example of a process flow in a system that supports enhanced DRX design for a shared frequency band in accordance with aspects of the present disclosure.

FIG. 7 illustrates an example of a process flow 700 for enhanced DRX paging for a shared frequency band in accordance with various aspects of the present disclosure. Process flow 700 may include base station 105-b and UE 115-c, which may each be examples of the devices described with reference to FIGS. 1-2, including, but not limited to base stations 105 and UEs 115.

Base station 105-b may transmit a configuration 705 for DRX operation on a cell in a shared frequency band to UE 115-c. UE 115-c may receive the transmitted configuration, which may include, for example, a set of paging opportunities and first and second paging intervals configured for each set of paging opportunities. In some examples, the first paging interval and the second paging interval may include the characteristics or the features of paging intervals described in reference to FIGS. 2-5.

At block 710, base station 105-b may determine whether a page (e.g., indicating the presence of data) for UE 115-c has been received from the network. At block 715, base station 105-b may a time for the next paging interval for the UE 115-c. The next paging interval may be, for example, the first paging interval or the second paging interval.

At block 720, base station 105-b may check channel access (e.g., perform an LBT procedure) and/or paging channel capacity for the cell. In some examples, the base station 105-b may not be able to gain access to the channel for the cell in the next paging interval. In such case, the base station 105-b may return to block 715 to determine the next paging interval for the UE 115-c. If the base station 105-b does gain access to the channel for a transmission 730 over the cell in the next paging interval of UE 115-c, the base station 105-b may transmit the page in the interval. However, in certain circumstances the base station 105-b may gain access to the channel but not include the page in the transmission 730 (e.g., due to paging channel capacity constraints or paging/data priority, etc.). In this case, the base station 105-b may transmit a pending paging indication so that the UE 115-c extends the current paging interval or enables reception for the next paging interval of the set of paging opportunities to receive the page.

At block 725, UE 115-c may enable reception for the first paging interval based at least in part on the received configuration. In some cases, transmission 730 may be during the first paging interval. At block 740, UE 115-c may detect whether one or more DL transmissions are received from a base station (e.g., base station 105-b). At the same time or a different time, UE 115-c may also detect a page or pending paging indication is received from the base station 105-b, including detecting whether at least a part of a DL transmission has been received, a page has been received, a pending paging indication has been received, other paging information has been received, or some combination. At block 745, UE 115-c may extend a first paging interval or enable reception for a second paging interval. In some examples, extending a first paging interval or enabling reception for a second paging interval may be based on information received from base station 105-b or one or more operations performed by UE 115-c (i.e., detecting whether a DL transmission is received). In some examples, based on receiving a pending paging indication, UE 115-c may extend a length of a first paging interval from an initial length to an extended length, which may enable the UE 115-c to receive the page in the currently detected transmission.

In some examples, based on receiving a pending paging indication, UE 115-c may enable reception for a second paging interval. This may occur despite UE 115-c previously receiving a DL transmission during an earlier paging interval. This allows for UE 115-c to receive paging information during a current set of paging opportunities when UE 115-c may be otherwise configured to disable reception for later paging intervals during the cycle because of a received DL transmission.

Base station 105-b may transmit one or more DL transmissions 730 to a UE (e.g., UE 115-c). In some examples, the base station may transmit a page or a pending paging indication 750—or other paging information-during one of the transmitted DL transmissions, which UE 115-c may receive during an extended first paging interval, a second paging interval, or some combination. Alternatively, in some examples, the base station may transmit a page or a pending paging indication 750—or other paging information-separate from one of the transmitted DL transmissions. Prior to sending a page to the UE 115-c during a paging interval, the base station 105-b may determine whether the UE 115-c will be awake during the paging interval. For example, where a page is identified for the UE 115-c after a first paging interval of the UE 115-c has passed but before a second paging interval, the base station 105-b may determine whether it sent a transmission 730 during the first paging interval. If the base station 105-b sent a transmission 730 during the first paging interval, the base station 105-b may wait until the next set of paging opportunities to page the UE 115-c. If the base station did not send a transmission 730 during the first paging interval, the base station 105-b may send the page to the UE 115-c in the second paging interval.

At block 755, UE 115-c may disable reception for a time, including, but not limited to, a remainder of the set of paging opportunities. In some examples, disabling reception may be based on a paging queue empty indication received by UE 115-c during a paging interval.

Figure 8:
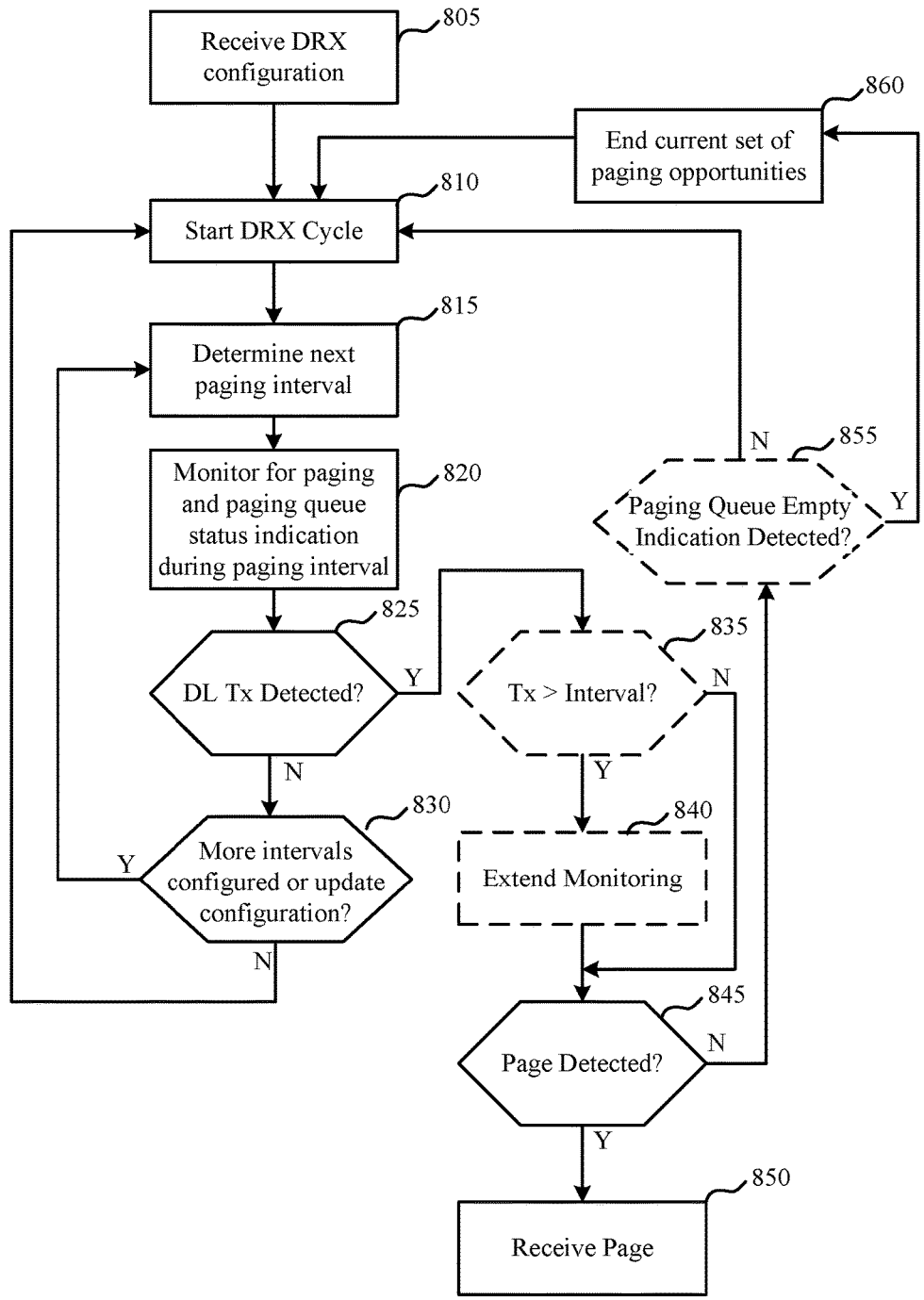
FIG. 8 illustrates an example of a process flow in a system that supports enhanced DRX design for a shared frequency band in accordance with aspects of the present disclosure.

FIG. 8 illustrates an example of a process flow 800 for enhanced DRX paging and related paging queue status indications for a shared frequency band in accordance with various aspects of the present disclosure. Process flow 800 describes information received and actions performed by a UE, which may an example of the devices described with reference to FIGS. 1-7, including, but not limited to UEs 115.

At block 805, the UE may receive a configuration for DRX operation on a cell of a shared frequency band that includes one or more paging intervals and information regarding processing of paging queue status indications. In some examples, the configuration may include multiple paging intervals, which may have the characteristics or the features of paging intervals described in reference to FIGS. 2-7. In some examples, the configuration received from the base station in block 805, may include a configuration specifying a set of paging opportunities including one paging interval (e.g., a first paging interval) or multiple paging intervals.

At block 810, the UE may start a DRX cycle based on the received configuration. In some cases, the DRX cycle may include initiating a set of paging opportunities using an enhanced window configuration. At block 815, the UE may determine a next paging interval of the set of paging opportunities. At block 820, the UE may monitor for paging and/or a paging queue status indication during the determined next paging interval. This monitoring may include the UE enabling reception at the beginning of the determined paging interval.

At decision block 825, the UE may determine whether a DL transmission was detected in the paging interval. The determination may be based on, for example, detecting a preamble transmitted by the cell, detecting a reference signal (e.g., a CRS) associated with the cell, or detecting other indicators of a transmission by the cell.

Based at least in part on the determinations performed at decision block 825, the UE may perform an operation. As one example, if no DL transmission is detected, at decision block 830 the UE may determine whether any more paging intervals are currently configured (e.g., there are more TTIs in a set of paging opportunities). If no more paging intervals in the set of paging opportunities are specified by the received configuration, the UE may proceed to block 810. If more paging intervals are specified by the received configuration, the UE may proceed to block 815 and may determine whether to enable reception during one or more additional configured paging intervals.

Based at least in part on the one or more determinations performed at decision block 825, the UE may determine at decision block 835 one or more characteristics of or relating to the received transmission, such as determining whether the DL transmission continues past the end of an enabled paging interval. If the DL transmission extends past the end of the paging interval, the UE may extend monitoring beyond the end of the paging interval at block 840.

At decision block 845, the UE may determine whether a page is detected at any time during the paging interval. If the UE determines that a page is detected, it may receive the page at block 850. If the UE determines that a page is not detected, the UE may determine whether a paging queue empty indication has been detected at decision block 855. In some examples, if the UE determines it received a paging queue empty indication at decision block 855, it will disable reception for a remainder of the DRX set of paging opportunities-returning to block 810. In some cases, disabling reception may include suppressing enabling of reception for a future paging interval, disabling reception for a remainder of the current paging interval, some combination, or other operations. Based on detecting a transmission in a paging interval at decision block 825 without detecting a page at decision block 845, the UE may disable reception at the end of the current paging interval and return to block 810 to start the next set of paging opportunities.

Figure 9:
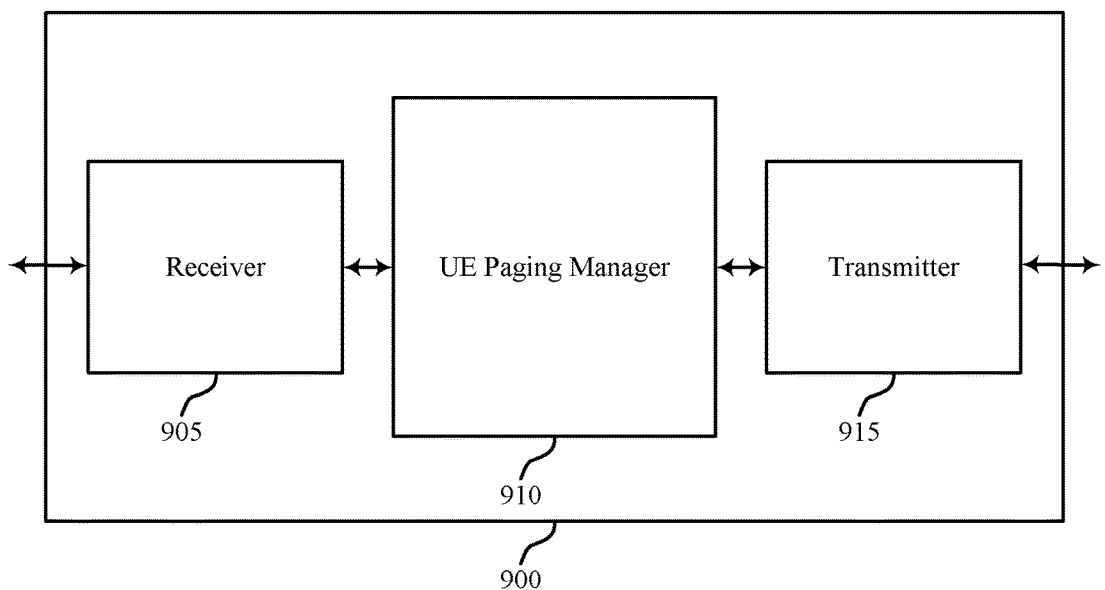
FIGS. 9 through 11 show block diagrams of a wireless device that supports enhanced DRX design for a shared frequency band in accordance with aspects of the present disclosure.

FIG. 9 shows a block diagram of a wireless device 900 that supports enhanced DRX design for a shared frequency band in accordance with various aspects of the present disclosure. Wireless device 900 may be an example of aspects of a UE 115 described with reference to FIGS. 1 and 2. Wireless device 900 may include receiver 905, UE paging manager 910 and transmitter 915. Wireless device 900 may also include a processor. Each of these components may be in communication with each other.

The receiver 905 may receive information such as packets, user data, or control information associated with various information channels (e.g., control channels, data channels, and information related to enhanced window DRX design for a shared frequency band, etc.). Information may be passed on to other components of the device. The receiver 905 may be an example of aspects of the transceiver 1225 described with reference to FIG. 12.

The UE paging manager 910 may receive a configuration for DRX operation on the cell, the configuration including one or more configured paging intervals for each set of paging opportunities. In some cases, the UE paging manager 910 may enable reception for a first paging interval of a first set of paging opportunities, detect whether a downlink transmission on the cell is present during the first paging interval, and determine whether to enable reception for a second paging interval of the first set of paging opportunities based on a result of the detecting. In some examples, the UE paging manager 910 may enable reception for a paging interval of a first set of paging opportunities according to a configuration for DRX operation on the cell, and receive, during the paging interval, a downlink transmission that includes a paging queue empty indication indicating that paging information for the UE will not be transmitted during the first set of paging opportunities. In some cases, the UE paging manager 910 may disable reception for a remainder of the first set of paging opportunities based on the paging queue empty indication. The UE paging manager 910 may also be an example of aspects of the UE paging manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
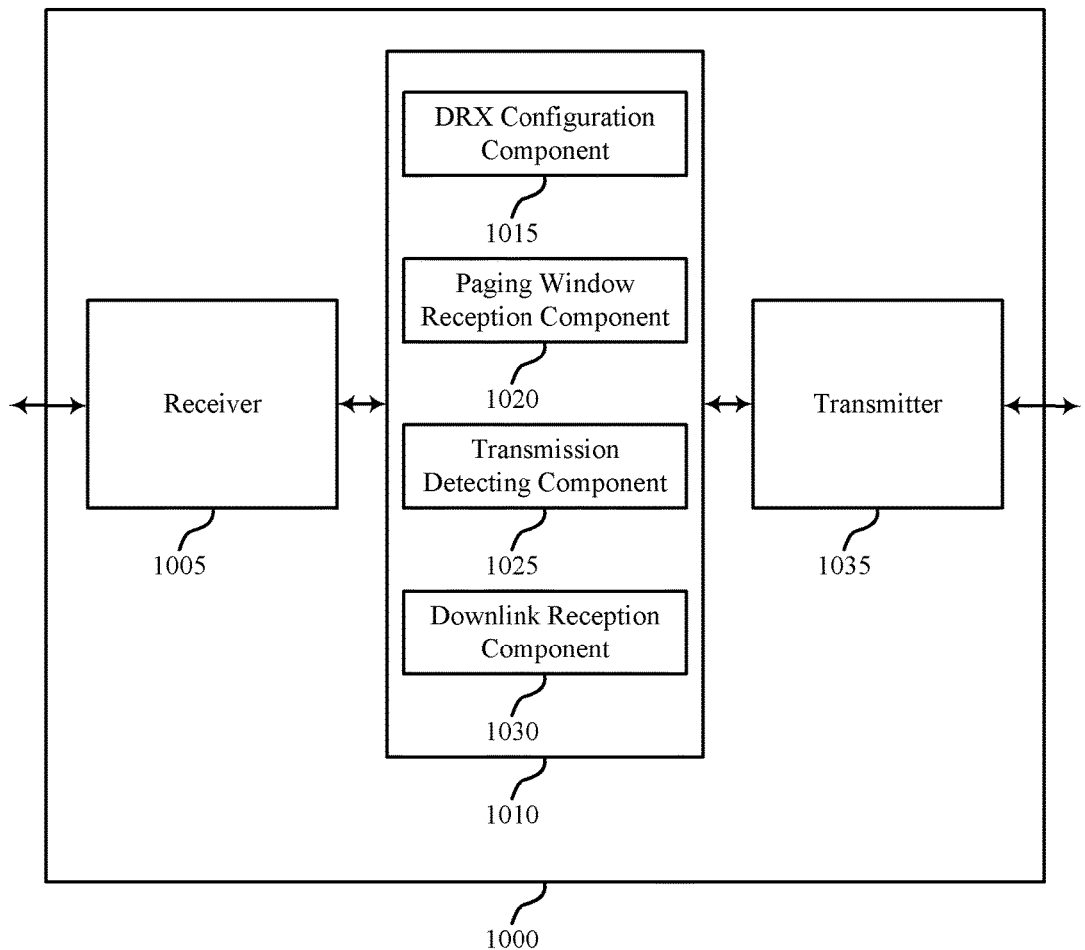

FIG. 10 shows a block diagram of a wireless device 1000 that supports enhanced window DRX design for a shared frequency band in accordance with various aspects of the present disclosure. Wireless device 1000 may be an example of aspects of a wireless device 900 or a UE 115 described with reference to FIGS. 1, 2 and 9. Wireless device 1000 may include receiver 1005, UE paging manager 1010 and transmitter 1035. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12. The UE paging manager 1010 may be an example of aspects of UE paging manager 910 described with reference to FIG. 9. The UE paging manager 1010 may include DRX configuration component 1015, paging interval reception component 1020, transmission detecting component 1025 and downlink reception component 1030. The UE paging manager 1010 may be an example of aspects of the UE paging manager 1205 described with reference to FIG. 12.

The DRX configuration component 1015 may receive a configuration for DRX operation on the cell, the configuration including one or more paging intervals for each set of paging opportunities. In some cases, the one or more paging intervals includes a first paging interval and a second paging interval, where the second paging interval is discontinuous in time from the first paging interval. In some cases, an offset between the first paging interval and the second paging interval comprises a UE-specific offset. In some cases, a length of the second paging interval is equal to or greater than a length of the first paging interval. In some cases, the configuration for DRX operation comprises a second paging interval, and where the disabling reception comprises disabling reception for the second paging interval of the first set of paging opportunities.

The paging interval reception component 1020 may enable reception for one or more paging intervals. In some cases, paging interval reception component 1020 may enable reception for the first paging interval of a first set of paging opportunities, and determine whether to enable reception for the second paging interval of the first set of paging opportunities based on a result of detecting downlink transmissions in the first paging interval. For example, paging interval reception component 1020 may enable reception for the second paging interval based on detecting that no downlink transmission on the cell is present during the first paging interval. In some cases, paging interval reception component 1020 may determine whether to enable reception for a third paging interval during the first set of paging opportunities based on detecting whether the downlink transmission is present during the second paging interval. In some cases, paging interval reception component 1020 may enable reception during the second paging interval based on the received pending paging indication. In some cases, paging interval reception component 1020 may enable reception for a paging interval of a first set of paging opportunities according to a configuration for DRX operation on the cell, and disable reception for a remainder of the first set of paging opportunities based on the paging queue empty indication.

In some cases, the disabling reception occurs before an end of the paging interval. In some cases, the paging queue empty indication is indicated in a physical channel of the downlink transmission. In some cases, the paging queue empty indication indicates that no paging information for at least a subset of UEs served by the cell will be transmitted in the first set of paging opportunities.

The transmission detecting component 1025 may detect whether a downlink transmission on the cell is present during the first paging interval. The downlink reception component 1030 may receive the downlink transmission on the cell during the first paging interval, where the downlink transmission comprises a pending paging indication indicating that the cell has additional paging information to be transmitted, and receive, during the paging interval, a downlink transmission that includes a paging queue empty indication indicating that paging information for the UE will not be transmitted during the first set of paging opportunities.

The transmitter 1035 may transmit signals received from other components of wireless device 1000. In some examples, the transmitter 1035 may be collocated with a receiver in a transceiver module. For example, the transmitter 1035 may be an example of aspects of the transceiver 1225 described with reference to FIG. 12. The transmitter 1035 may utilize a single antenna, or it may utilize a plurality of antennas.

Figure 11:
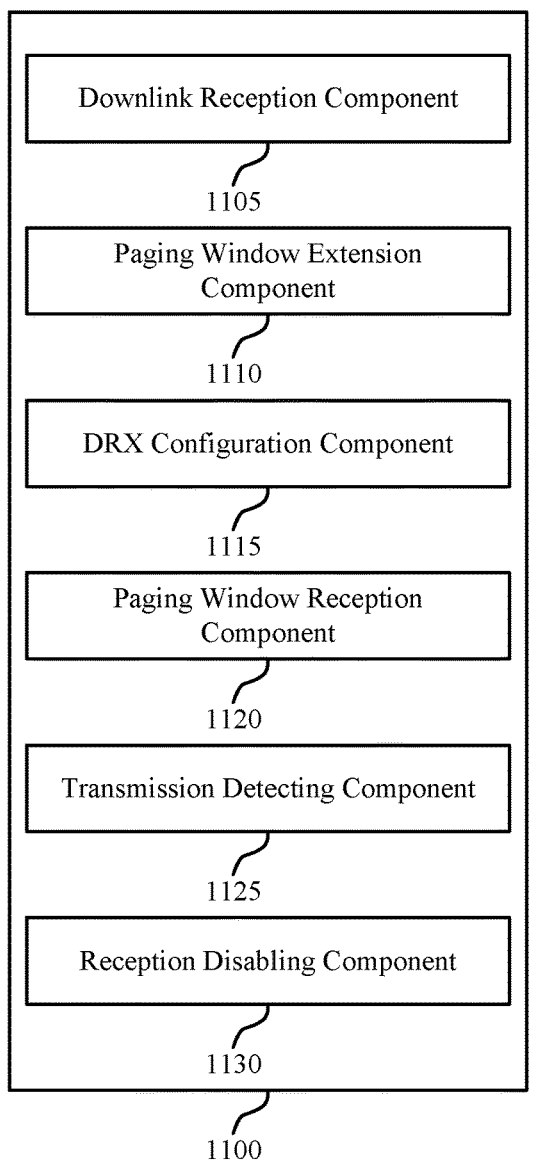

FIG. 11 shows a block diagram of a UE paging manager 1100 which may be an example of the corresponding component of wireless device 900 or wireless device 1000. That is, UE paging manager 1100 may be an example of aspects of UE paging manager 910 or UE paging manager 1010 described with reference to FIGS. 9 and 10. The UE paging manager 1100 may also be an example of aspects of the UE paging manager 1205 described with reference to FIG. 12. The UE paging manager 1100 may include downlink reception component 1105, paging interval extension component 1110, DRX configuration component 1115, paging interval reception component 1120, transmission detecting component 1125 and reception disabling component 1130. Each of these modules may communicate, directly or indirectly, with one another (e.g., via one or more buses).

The DRX configuration component 1115 may receive a configuration for DRX operation on the cell, the configuration including a first paging interval and a second paging interval for each set of paging opportunities. In some cases, an offset between the first paging interval and the second paging interval comprises a UE-specific offset.

The downlink reception component 1105 may receive the downlink transmission on the cell during the first paging interval, where the downlink transmission comprises a pending paging indication indicating that the cell has additional paging information to be transmitted, or receive, during the paging interval, a downlink transmission that includes a paging queue empty indication indicating that paging information for the UE will not be transmitted during the first set of paging opportunities.

The paging interval extension component 1110 may extend the first paging interval based on the received pending paging indication, or extend the first paging interval based on detecting that the downlink transmission on the cell is present during the first paging interval and extends beyond an end of the first paging interval.

The paging interval reception component 1120 may enable reception for one or more paging intervals. For example, paging interval reception component 1120 may enable reception for the second paging interval based on detecting that no downlink transmission on the cell is present during the first paging interval. In some cases, paging interval reception component 1120 may determine whether to enable reception for a third paging interval during the first set of paging opportunities based on detecting whether the downlink transmission is present during the second paging interval, where a first offset between the first paging interval and the second paging interval is different than a second offset between the second paging interval and the third paging interval. In some cases, paging interval reception component 1120 may enable reception during the second paging interval based on the received pending paging indication, and enable reception for a paging interval of a first set of paging opportunities according to a configuration for DRX operation on the cell. In some cases, paging interval reception component 1120 may disable reception for a remainder of the first set of paging opportunities based on a paging queue empty indication.

The transmission detecting component 1125 may detect whether a downlink transmission on the cell is present during the first paging interval. The reception disabling component 1130 may disable reception at an end of the first paging interval.

Figure 12:
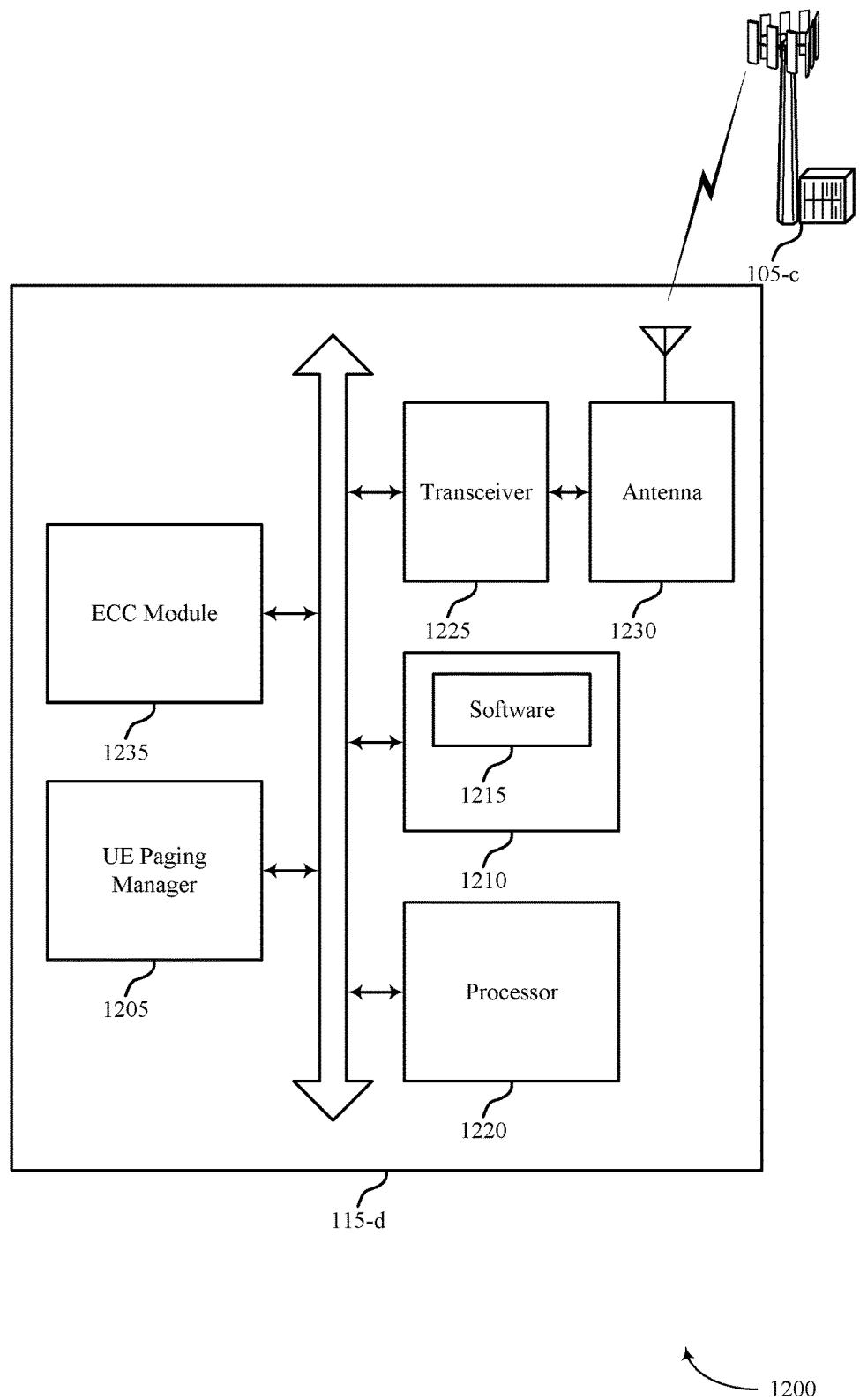
FIG. 12 illustrates a block diagram of a system including a UE that supports enhanced DRX design for a shared frequency band in accordance with aspects of the present disclosure.

FIG. 12 shows a diagram of a system 1200 including a device that supports enhanced window DRX design for a shared frequency band in accordance with various aspects of the present disclosure. For example, system 1200 may include UE 115-d, which may be an example of a wireless device 900, a wireless device 1000, or a UE 115 as described with reference to FIGS. 1, 2 and 9 through 11.

UE 115-d may also include UE paging manager 1205, memory 1210, processor 1220, transceiver 1225, antenna 1230 and ECC module 1235. Each of these modules may communicate, directly or indirectly, with one another (e.g., via one or more buses). The UE paging manager 1205 may be an example of a UE paging manager 910, 1010, or 1100 as described with reference to FIGS. 9 through 11. The memory 1210 may include random access memory (RAM) and read only memory (ROM). The memory 1210 may store computer-readable, computer-executable software including instructions that, when executed, cause the processor to perform various functions described herein (e.g., enhanced window DRX design for a shared frequency band, etc.). In some cases, the software 1215 may not be directly executable by the processor but may cause a computer (e.g., when compiled and executed) to perform functions described herein. The processor 1220 may include an intelligent hardware device, (e.g., a central processing unit (CPU), a microcontroller, an application specific integrated circuit (ASIC), etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases, the device may have more than one antenna 1230, which may be capable of concurrently transmitting or receiving multiple wireless transmissions.

ECC module 1235 may enable operations using eCCs such as communication using shared or unlicensed spectrum, using reduced TTIs or subframe durations, or using a large number of component carriers.

Figure 13:
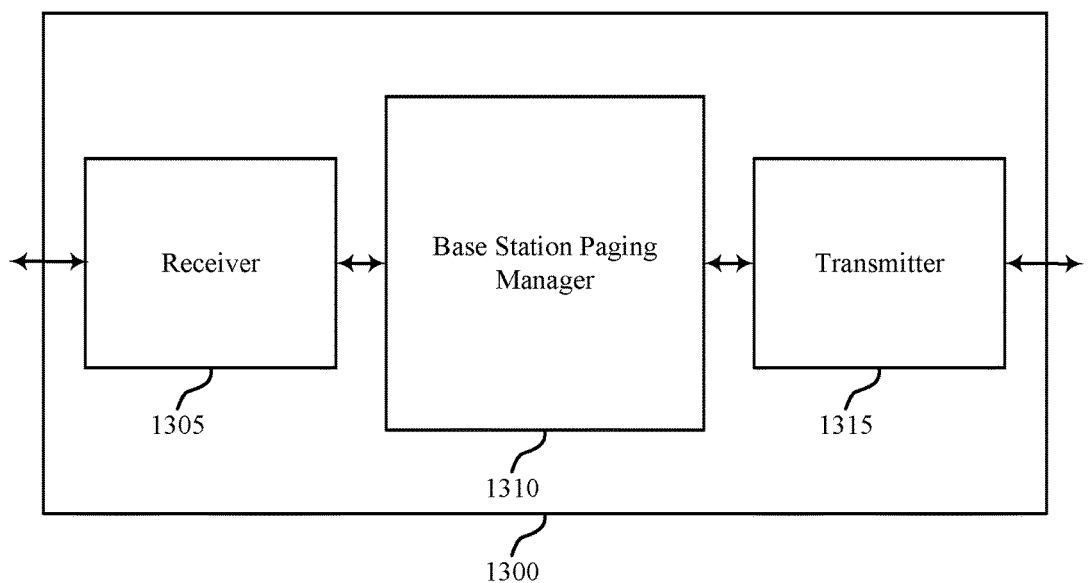
FIGS. 13 through 15 show block diagrams of a wireless device that supports enhanced DRX design for a shared frequency band in accordance with aspects of the present disclosure.

FIG. 13 shows a block diagram of a wireless device 1300 that supports enhanced window DRX design for a shared frequency band in accordance with various aspects of the present disclosure. Wireless device 1300 may be an example of aspects of a base station 105 described with reference to FIGS. 1 and 2. Wireless device 1300 may include receiver 1305, base station paging manager 1310 and transmitter 1315. Wireless device 1300 may also include a processor. Each of these components may be in communication with each other.

The receiver 1305 may receive information such as packets, user data, or control information associated with various information channels (e.g., control channels, data channels, and information related to enhanced window DRX design for a shared frequency band, etc.). Information may be passed on to other components of the device. The receiver 1305 may be an example of aspects of the transceiver 1625 described with reference to FIG. 16.

The base station paging manager 1310 may configure, by a base station serving one or more UEs on a cell via a channel of a shared frequency band, a first UE for DRX operation according to a DRX configuration including one or more paging intervals for each set of paging opportunities. In some cases, base station paging manager 1310 may determine a first paging interval and a second paging interval for a first set of paging opportunities, and determine an ability to transmit a page to the first UE during one of the first paging interval or the second paging interval based at least in part a channel access procedure for the channel. In some cases, base station paging manager 1310 may transmit the page on the cell based on the determining the ability to transmit the page to the first UE. In some cases, base station paging manager 1310 may determine whether paging information for the one or more UEs is pending, and transmit the data transmission based on the channel access procedure, the data transmission comprising a paging queue empty indication indicating that no pages are pending based on a result of the determining. The base station paging manager 1310 may also be an example of aspects of the base station paging manager 1605 described with reference to FIG. 16.

The transmitter 1315 may transmit signals received from other components of wireless device 1300. In some examples, the transmitter 1315 may be collocated with a receiver in a transceiver module. For example, the transmitter 1315 may be an example of aspects of the transceiver 1625 described with reference to FIG. 16. The transmitter 1315 may include a single antenna, or it may include a plurality of antennas.

Figure 14:
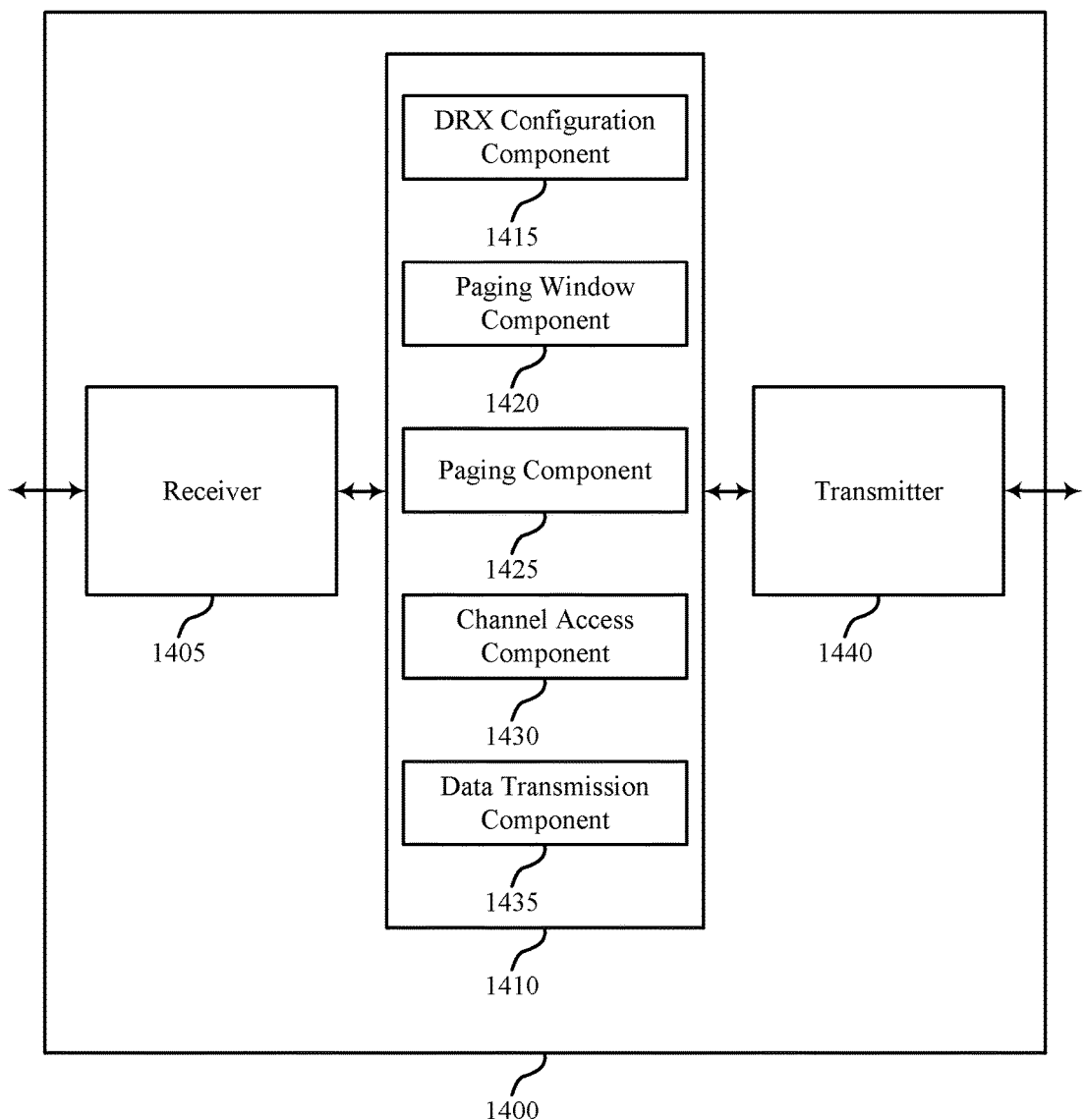

FIG. 14 shows a block diagram of a wireless device 1400 that supports enhanced window DRX design for a shared frequency band in accordance with various aspects of the present disclosure. Wireless device 1400 may be an example of aspects of a wireless device 1300 or a base station 105 described with reference to FIGS. 1, 2 and 13. Wireless device 1400 may include receiver 1405, base station paging manager 1410 and transmitter 1440. Wireless device 1400 may also include a processor. Each of these components may be in communication with each other.

The receiver 1405 may receive information which may be passed on to other components of the device. The receiver 1405 may also perform the functions described with reference to the receiver 1305 of FIG. 13. The receiver 1405 may be an example of aspects of the transceiver 1625 described with reference to FIG. 16. The base station paging manager 1410 may be an example of aspects of base station paging manager 1310 described with reference to FIG. 13. The base station paging manager 1410 may include DRX configuration component 1415, paging interval component 1420, paging component 1425, channel access component 1430 and data transmission component 1435. The base station paging manager 1410 may be an example of aspects of the base station paging manager 1605 described with reference to FIG. 16.

The DRX configuration component 1415 may configure, by a base station serving one or more UEs on a cell via a channel of a shared frequency band, a first UE for DRX operation according to a DRX configuration including a one or more paging intervals for each set of paging opportunities, and adapt at least one of a number of paging intervals, a length of the paging intervals, or a length of paging interval gaps of the DRX configuration for the first UE based on the detected interference level. The paging interval component 1420 may determine the first paging interval and the second paging interval for a first set of paging opportunities, and determine a paging interval for the one or more UEs, wherein transmitting the paging queue empty indication in the data transmission is based on the determining the paging interval.

The paging component 1425 may determine an ability to transmit a page to the first UE during one of the first paging interval or the second paging interval based at least in part a channel access procedure for the channel, and transmit the page on the cell based on the determining the ability to transmit the page to the first UE. In some cases, paging component 1425 may transmit the page during the second paging interval based on the channel access procedure determining that the channel is busy during the first paging interval, and transmit the page during the second paging interval based on the channel access procedure determining that the channel is not busy during the second paging interval. In some cases, paging component 1425 may transmit the new page during a subsequent paging interval of the first set of paging opportunities or a paging interval of a second set of paging opportunities based on determining whether a downlink transmission was sent via the channel during the first paging interval, and determine whether paging information for the one or more UEs is pending.

The channel access component 1430 may perform, by a base station serving one or more UEs via a channel of a shared frequency band, a channel access procedure for access to the channel for a data transmission. The data transmission component 1435 may transmit the data transmission based on the channel access procedure, the data transmission comprising a paging queue empty indication indicating that no pages are pending based on a result of the determining.

The transmitter 1440 may transmit signals received from other components of wireless device 1400. In some examples, the transmitter 1440 may be collocated with a receiver in a transceiver module. For example, the transmitter 1440 may be an example of aspects of the transceiver 1625 described with reference to FIG. 16. The transmitter 1440 may utilize a single antenna, or it may utilize a plurality of antennas.

Figure 15:
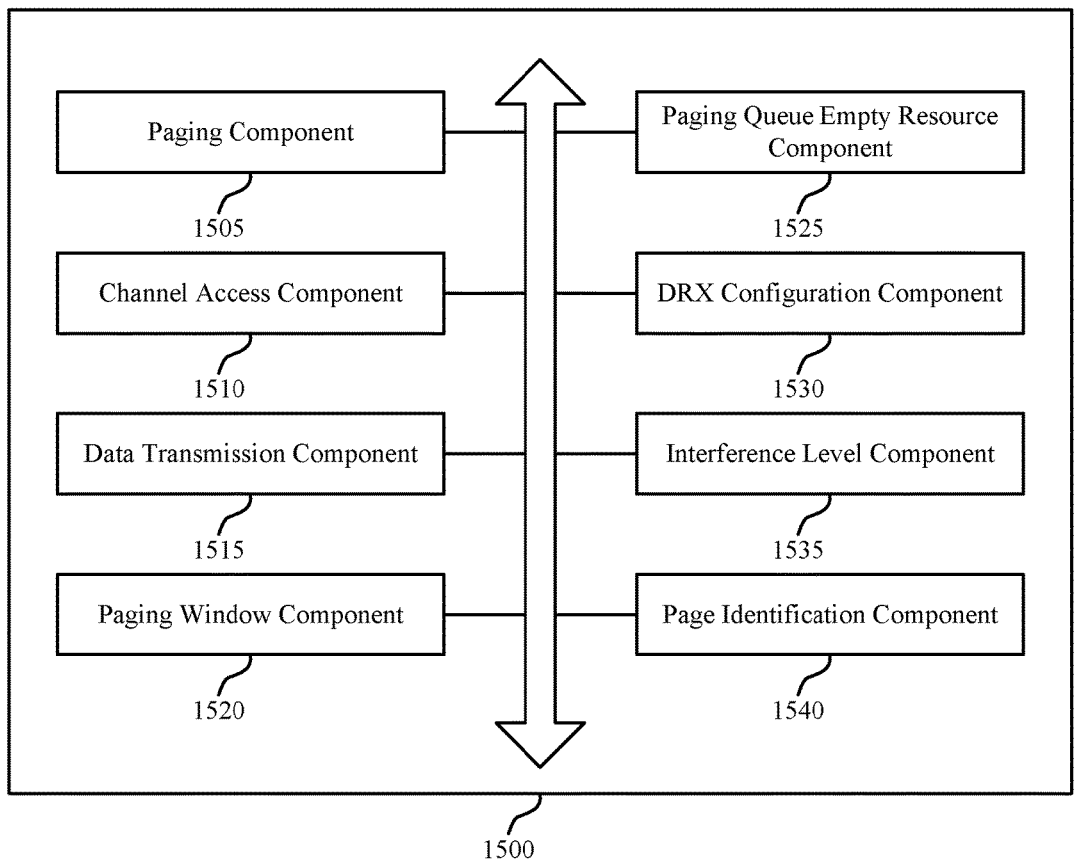

FIG. 15 shows a block diagram of a base station paging manager 1500 which may be an example of the corresponding component of wireless device 1300 or wireless device 1400. That is, base station paging manager 1500 may be an example of aspects of base station paging manager 1310 or base station paging manager 1410 described with reference to FIGS. 13 and 14. The base station paging manager 1500 may also be an example of aspects of the base station paging manager 1605 described with reference to FIG. 16.

The base station paging manager 1500 may include paging component 1505, channel access component 1510, data transmission component 1515, paging interval component 1520, paging queue empty resource component 1525, DRX configuration component 1530, interference level component 1535 and page identification component 1540. Each of these modules may communicate, directly or indirectly, with one another (e.g., via one or more buses).

The paging component 1505 may determine an ability to transmit a page to the first UE during one of the first paging interval or the second paging interval based at least in part a channel access procedure for the channel, and transmit the page on the cell based on the determining the ability to transmit the page to the first UE. In some cases, paging component 1505 may transmit the page during the second paging interval based on the channel access procedure determining that the channel is busy during the first paging interval, and transmit the page during the second paging interval based on the channel access procedure determining that the channel is not busy during the second paging interval. In some cases, paging component 1505 may transmit the new page during a subsequent paging interval of the first set of paging opportunities or a paging interval of a second set of paging opportunities based on determining whether a downlink transmission was sent via the channel during the first paging interval, and determine whether paging information for the one or more UEs is pending.

The channel access component 1510 may perform, by a base station serving one or more UEs via a channel of a shared radio frequency spectrum band, a channel access procedure for access to the channel for a data transmission. The data transmission component 1515 may transmit the data transmission based on the channel access procedure, the data transmission comprising a paging queue empty indication indicating that no pages are pending. The paging interval component 1520 may determine the first paging interval and the second paging interval for a first set of paging opportunities, and determine a paging interval for the one or more UEs. The paging queue empty resource component 1525 may determine a resource for the paging queue empty indication based on a mask function or a hash function of identifiers associated with the one or more UEs. In some cases, the paging queue empty indication is indicated in a physical channel of the data transmission.

The DRX configuration component 1530 may configure, by a base station serving one or more UEs on a cell via a channel of a shared frequency band, a first UE for DRX operation according to a DRX configuration including a first paging interval and a second paging interval for each set of paging opportunities, and adapt at least one of a number of paging intervals or a length of paging interval gaps of the DRX configuration for the first UE based on the detected interference level. The interference level component 1535 may detect an interference level of the channel. The page identification component 1540 may identify, subsequent to the first paging interval, a new page for the first UE.

Figure 16:
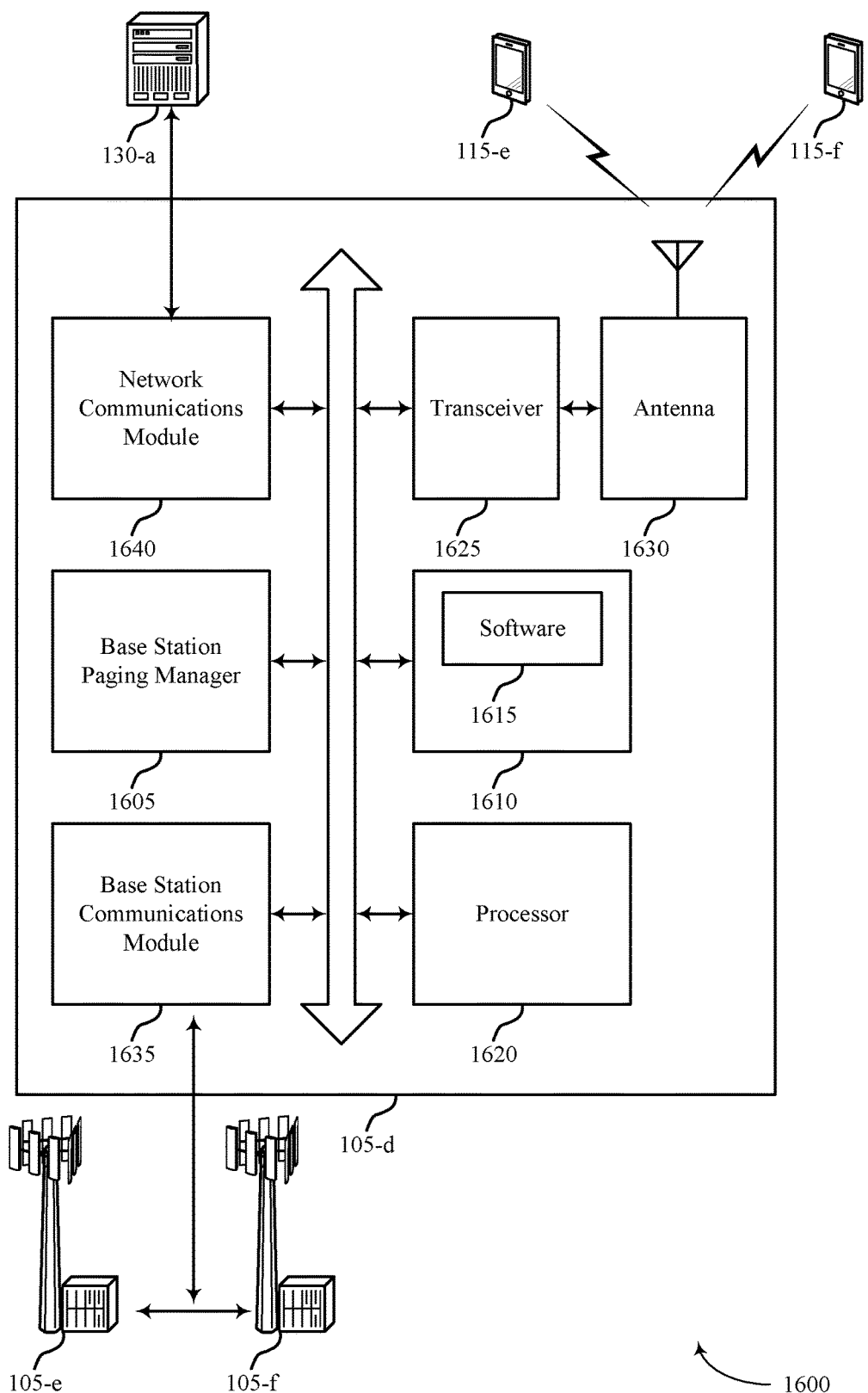
FIG. 16 illustrates a block diagram of a system including a base station that supports enhanced DRX design for a shared frequency band in accordance with aspects of the present disclosure.

FIG. 16 shows a diagram of a wireless system 1600 including a device configured that supports enhanced DRX design for a shared frequency band in accordance with various aspects of the present disclosure. For example, wireless system 1600 may include base station 105-d, which may be an example of a wireless device 1300, a wireless device 1400, or a base station 105 as described with reference to FIGS. 1, 2 and 13 through 15. Base station 105-d may also include components for bi-directional voice and data communications including components for transmitting communications and components for receiving communications. For example, base station 105-d may communicate bi-directionally with one or more UEs 115.

Base station 105-d may also include base station paging manager 1605, memory 1610, processor 1620, transceiver 1625, antenna 1630, base station communications module 1635 and network communications module 1640. Each of these modules may communicate, directly or indirectly, with one another (e.g., via one or more buses). The base station paging manager 1605 may be an example of a base station paging manager 1310, 1410, or 1500 as described with reference to FIGS. 13 through 15.

The memory 1610 may include RAM and ROM. The memory 1610 may store computer-readable, computer-executable software including instructions that, when executed, cause the processor to perform various functions described herein (e.g., features for enhanced DRX design for a shared frequency band, etc.). In some cases, the software 1615 may not be directly executable by the processor but may cause a computer (e.g., when compiled and executed) to perform functions described herein. The processor 1620 may include an intelligent hardware device, (e.g., a CPU, a microcontroller, an ASIC, etc.)

The transceiver 1625 may communicate bi-directionally, via one or more antennas, wired, or wireless links, with one or more networks, as described above. For example, the transceiver 1625 may communicate bi-directionally with a base station 105 or a UE 115. The transceiver 1625 may also include a modem to modulate the packets and provide the modulated packets to the antennas for transmission, and to demodulate packets received from the antennas. In some cases, the wireless device may include a single antenna 1630. However, in some cases, the device may have more than one antenna 1230, which may be capable of concurrently transmitting or receiving multiple wireless transmissions.

The base station communications module 1635 may manage communications with other base station 105, and may include a controller or scheduler for controlling communications with UEs 115 in cooperation with other base stations 105. For example, the base station communications module 1635 may coordinate scheduling for transmissions to UEs 115 for various interference mitigation techniques such as beamforming or joint transmission. In some examples, base station communications module 1635 may provide an X2 interface within an LTE/LTE-A wireless communication network technology to provide communication between base stations 105. The network communications module 1640 may manage communications with the core network (e.g., via one or more wired backhaul links). For example, the network communications module 1640 may manage the transfer of data communications for client devices, such as one or more UEs 115.

Figure 17:
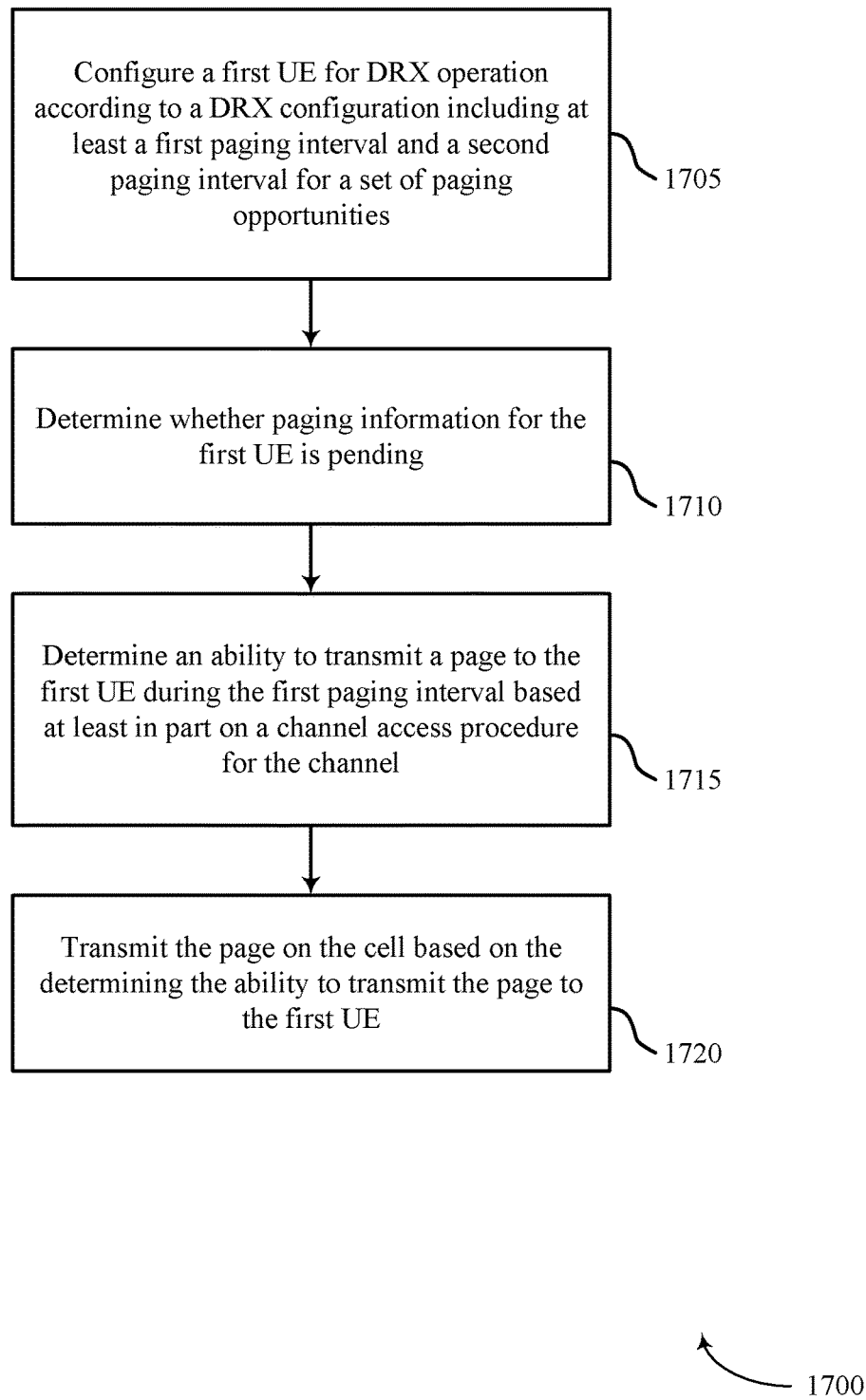
FIGS. 17 through 20 illustrate methods for enhanced DRX design for a shared frequency band in accordance with aspects of the present disclosure.

FIG. 17 shows a flowchart illustrating a method 1700 for enhanced DRX design for a shared frequency band in accordance with various aspects of the present disclosure. The operations of method 1700 may be implemented by a device such as a base station 105 or its components as described with reference to FIGS. 1 and 2. For example, the operations of method 1700 may be performed by the base station paging manager as described herein. In some examples, the base station 105 may execute a set of codes to control the functional elements of the device to perform the functions described below. Additionally or alternatively, the base station 105 may perform aspects the functions described below using special-purpose hardware.

At block 1705, the base station 105 may configure, by a base station serving one or more UEs on a cell via a channel of a shared frequency band, a first UE for DRX operation according to a DRX configuration including a first paging interval and a second paging interval for each set of paging opportunities as described above with reference to FIGS. 2 through 8. In certain examples, the operations of block 1705 may be performed by the DRX configuration component 1015 or 1115 as described with reference to FIGS. 10 and 11.

At block 1710, the base station 105 may determine the first paging interval and the second paging interval for a first set of paging opportunities as described above with reference to FIGS. 2 through 8. In certain examples, the operations of block 1710 may be performed by the paging interval component 1420 or 1520 as described with reference to FIGS. 14 and 15.

At block 1715, the base station 105 may determine an ability to transmit a page to the first UE during one of the first paging interval or the second paging interval based at least in part a channel access procedure for the channel as described above with reference to FIGS. 2 through 8. In certain examples, the operations of block 1715 may be performed by the paging component 1425 or 1505 as described with reference to FIGS. 14 and 15. At block 1720, the base station 105 may transmit the page on the cell based on the determining the ability to transmit the page to the first UE as described above with reference to FIGS. 2 through 8. In certain examples, the operations of block 1720 may be performed by the paging component 1425 or 1505 as described with reference to FIGS. 14 and 15.

Figure 18:
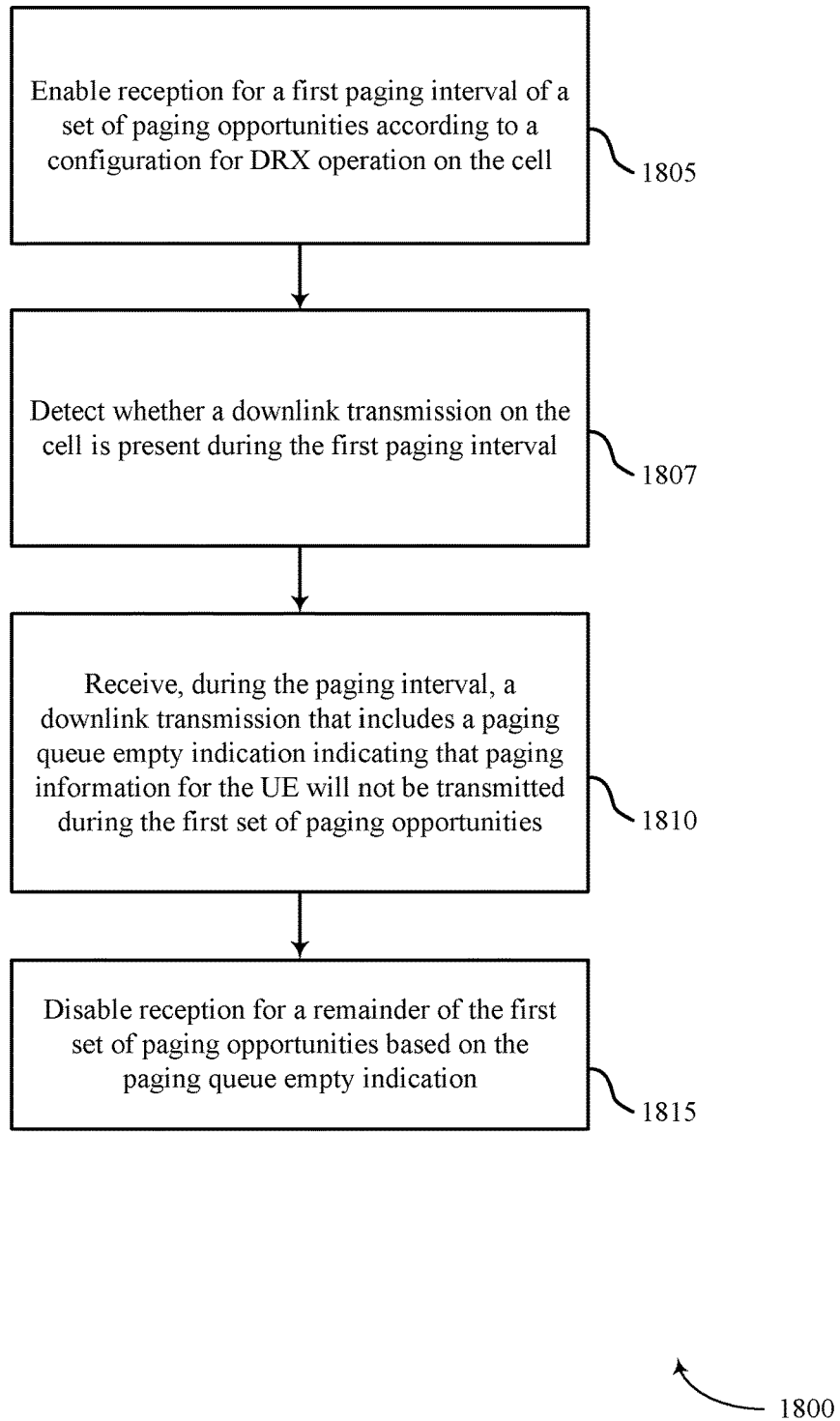

FIG. 18 shows a flowchart illustrating a method 1800 for enhanced DRX design for a shared frequency band in accordance with various aspects of the present disclosure. The operations of method 1800 may be implemented by a device such as a UE 115 or its components as described with reference to FIGS. 1 and 2. For example, the operations of method 1800 may be performed by the UE paging manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may enable reception for a paging interval of a first set of paging opportunities according to a configuration for DRX operation on the cell as described above with reference to FIGS. 2 through 8. In certain examples, the operations of block 1805 may be performed by the paging interval reception component 1020 or 1120 as described with reference to FIGS. 10 and 11.

At block 1807, the UE 115 may detect whether a downlink transmission on the cell is present during the first paging interval as described above with reference to FIGS. 2 through 8. In certain examples, the operations of block 1807 may be performed by the transmission detecting component 1025 or 1125 as described with reference to FIGS. 10 and 11.

At block 1810, the UE 115 may receive, during the paging interval, a downlink transmission that includes a paging queue empty indication indicating that paging information for the UE will not be transmitted during the first set of paging opportunities as described above with reference to FIGS. 2 through 8. In certain examples, the operations of block 1810 may be performed by the downlink reception component 1030 or 1105 as described with reference to FIGS. 10 and 11.

At block 1815, the UE 115 may disable reception for a remainder of the first set of paging opportunities based on the paging queue empty indication as described above with reference to FIGS. 2 through 8. In certain examples, the operations of block 1815 may be performed by the paging interval reception component 1020 or 1120 as described with reference to FIGS. 10 and 11.

Figure 19:
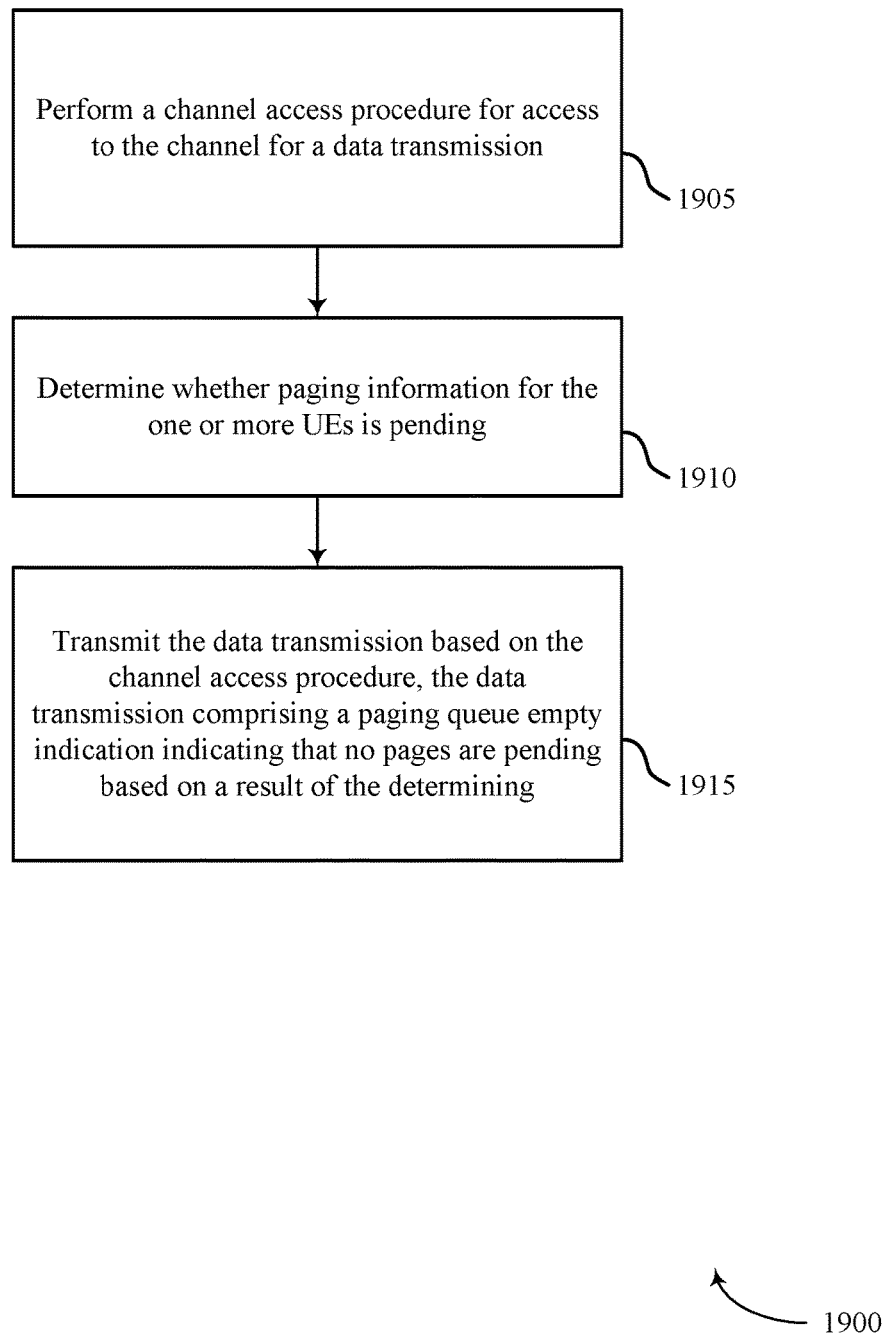

FIG. 19 shows a flowchart illustrating a method 1900 for enhanced DRX design for a shared frequency band in accordance with various aspects of the present disclosure. The operations of method 1900 may be implemented by a device such as a base station 105 or its components as described with reference to FIGS. 1 and 2. For example, the operations of method 1900 may be performed by the base station paging manager as described herein. In some examples, the base station 105 may execute a set of codes to control the functional elements of the device to perform the functions described below. Additionally or alternatively, the base station 105 may perform aspects the functions described below using special-purpose hardware.

At block 1905, the base station 105 may perform, by a base station serving one or more UEs via a channel of a shared frequency band, a channel access procedure for access to the channel for a data transmission as described above with reference to FIGS. 2 through 8. In certain examples, the operations of block 1905 may be performed by the channel access component 1430 or 1510 as described with reference to FIGS. 14 and 15.

At block 1910, the base station 105 may determine whether paging information for the one or more UEs is pending as described above with reference to FIGS. 2 through 8. In certain examples, the operations of block 1910 may be performed by the paging component 1425 or 1505 as described with reference to FIGS. 14 and 15.

At block 1915, the base station 105 may transmit the data transmission based on the channel access procedure, the data transmission comprising a paging queue empty indication indicating that no pages are pending based on a result of the determining as described above with reference to FIGS. 2 through 8. In certain examples, the operations of block 1915 may be performed by the data transmission component 1435 or 1515 as described with reference to FIGS. 14 and 15.

Figure 20:
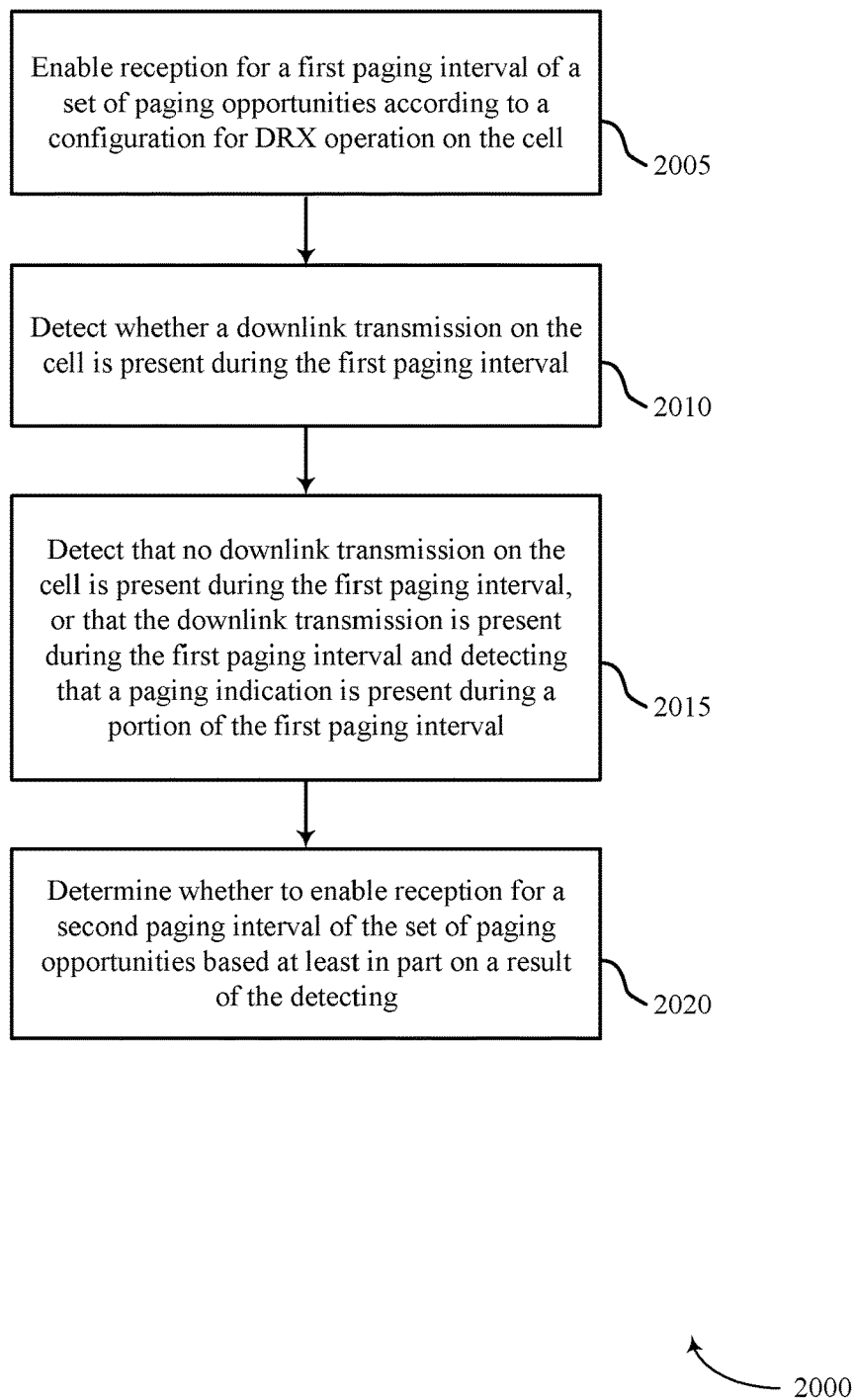

FIG. 20 shows a flowchart illustrating a method 2000 for enhanced DRX design for a shared frequency band in accordance with various aspects of the present disclosure. The operations of method 2000 may be implemented by a device such as a UE 115 or its components as described with reference to FIGS. 1 and 2. For example, the operations of method 2000 may be performed by the UE paging manager as described herein. In some examples, the UE 115 may execute a set of codes to control the functional elements of the device to perform the functions described below. Additionally or alternatively, the UE 115 may perform aspects the functions described below using special-purpose hardware.

At block 2005, the UE 115 may enable reception for a paging interval of a first set of paging opportunities according to a configuration for DRX operation on the cell as described above with reference to FIGS. 2 through 8. In certain examples, the operations of block 2005 may be performed by the paging interval reception component 1020 or 1120 as described with reference to FIGS. 10 and 11.

At block 2010, the UE 115 may detect whether a downlink transmission on the cell is present during the first paging interval as described above with reference to FIGS. 2 through 8. In certain examples, the operations of block 2010 may be performed by the transmission detecting component 1025 or 1125 as described with reference to FIGS. 10 and 11.

At block 2015, the UE 115 may detect that no downlink transmission on the cell is present during the first paging interval, or that the downlink transmission is present during the first paging interval and detecting that a paging indication is present during a portion of the first paging interval as described above with reference to FIGS. 2 through 8. In certain examples, the operations of block 2015 may be performed by the transmission detecting component 1025 or 1125 as described with reference to FIGS. 10 and 11.

At block 2020, the UE 115 may determine whether to enable reception for a second paging interval of the set of paging opportunities based at least in part on a result of the detecting as described above with reference to FIGS. 2 through 8. In certain examples, the operations of block 2020 may be performed by the paging interval reception component 1020 or 1120 as described with reference to FIGS. 10 and 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for enhanced DRX design for a shared frequency band.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for enhanced DRX design for a shared frequency band. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication, comprising:
configuring, by a base station serving one or more user equipments (UEs) on a cell via a channel of a shared frequency band, a first UE for discontinuous reception (DRX) operation according to a DRX configuration including at least a first paging interval and a second paging interval for a set of paging opportunities;
determining whether paging information for the first UE is pending;
determining an ability to transmit a page to the first UE during the first paging interval based at least in part on a channel access procedure for the channel; and
transmitting the page on the cell based on the determining the ability to transmit the page to the first UE.

2. The method of claim 1, further comprising:
transmitting the page during the second paging interval based on the channel access procedure determining that the channel is busy during the first paging interval.

3. The method of claim 2, further comprising:
detecting an interference level of the channel; and
adapting at least one of a number of paging intervals or a length of paging interval gaps of the DRX configuration for the first UE based on the detected interference level.

4. The method of claim 1, wherein the determining whether paging information for the one or more UEs is pending occurs subsequent to the first paging interval.

5. The method of claim 4, wherein the transmitting of the page is during a paging interval of a subsequent set of paging opportunities based at least in part on determining that a downlink transmission was sent via the channel during the first paging interval.

6. The method of claim 1, further comprising:
transmitting a data transmission based on the channel access procedure, the data transmission comprising a paging queue empty indication indicating that no pages are pending based on a result of the determining whether paging information for the one or more UEs is pending.

7. The method of claim 6, further comprising:
determining a resource for the paging queue empty indication based on a mask function or a hash function of identifiers associated with the one or more UEs.

8. The method of claim 6, wherein the paging queue empty indication is indicated in a physical channel of the downlink transmission, in a physical frame format indication channel (PFFICH), in a physical micro sleep indicator channel (PMSICH), in a physical broadcast channel (PBCH), in a radio resource control (RRC) message, in a message masked with a radio network temporary identity (RNTI), or any combination thereof.

9. The method of claim 1, wherein the downlink transmission comprises a reference signal, a cell-specific reference signal (CRS), a discovery reference signal (DRS), or any combination thereof.

10. An apparatus for wireless communication, comprising:
a processor;
memory in electronic communication with the processor; and
instructions stored in the memory and operable, when executed by the processor, to cause the apparatus to:
configure, by a base station serving one or more user equipments (UEs) on a cell via a channel of a shared frequency band, a first UE for discontinuous reception (DRX) operation according to a DRX configuration including at least a first paging interval and a second paging interval for a set of paging opportunities;
determine whether paging information for the first UE is pending;
determine an ability to transmit a page to the first UE during the first paging interval based at least in part on a channel access procedure for the channel; and
transmit the page on the cell based on the determining the ability to transmit the page to the first UE.

11. The apparatus of claim 10, wherein the instructions are further executable by the processor to:
transmit the page during the second paging interval based on the channel access procedure determining that the channel is busy during the first paging interval.

12. The apparatus of claim 11, wherein the instructions are further executable by the processor to:
detect an interference level of the channel; and
adapt at least one of a number of paging intervals or a length of paging interval gaps of the DRX configuration for the first UE based on the detected interference level.

13. The apparatus of claim 10, wherein the determining whether paging information for the one or more UEs is pending occurs subsequent to the first paging interval.

14. The apparatus of claim 13, wherein the transmitting of the page is during a paging interval of a subsequent set of paging opportunities based at least in part on determining that a downlink transmission was sent via the channel during the first paging interval.

15. The apparatus of claim 10, wherein the instructions are further executable by the processor to:
transmit a data transmission based on the channel access procedure, the data transmission comprising a paging queue empty indication indicating that no pages are pending based on a result of the determining whether paging information for the one or more UEs is pending.

16. The apparatus of claim 15, wherein the instructions are further executable by the processor to:
determine a resource for the paging queue empty indication based on a mask function or a hash function of identifiers associated with the one or more UEs.

17. The apparatus of claim 15, wherein the paging queue empty indication is indicated in a physical channel of the downlink transmission, in a physical frame format indication channel (PFFICH), in a physical micro sleep indicator channel (PMSICH), in a physical broadcast channel (PBCH), in a radio resource control (RRC) message, in a message masked with a radio network temporary identity (RNTI), or any combination thereof.

18. The apparatus of claim 10, wherein the downlink transmission comprises a reference signal, a cell-specific reference signal (CRS), a discovery reference signal (DRS), or any combination thereof.

19. An apparatus for wireless communication, comprising:
means for configuring, by a base station serving one or more user equipments (UEs) on a cell via a channel of a shared frequency band, a first UE for discontinuous reception (DRX) operation according to a DRX configuration including at least a first paging interval and a second paging interval for a set of paging opportunities;
means for determining whether paging information for the first UE is pending;
means for determining an ability to transmit a page to the first UE during the first paging interval based at least in part on a channel access procedure for the channel; and means for transmitting the page on the cell based on the determining the ability to transmit the page to the first UE.

20. The apparatus of claim 19, further comprising:
means for transmitting the page during the second paging interval based on the channel access procedure determining that the channel is busy during the first paging interval.

21. The apparatus of claim 20, further comprising:
means for detecting an interference level of the channel; and
means for adapting at least one of a number of paging intervals or a length of paging interval gaps of the DRX configuration for the first UE based on the detected interference level.

22. The apparatus of claim 19, wherein the determining whether paging information for the one or more UEs is pending occurs subsequent to the first paging interval.

23. The apparatus of claim 22, wherein the transmitting of the page is during a paging interval of a subsequent set of paging opportunities based at least in part on determining that a downlink transmission was sent via the channel during the first paging interval.

24. The apparatus of claim 19, further comprising:
means for transmitting a data transmission based on the channel access procedure, the data transmission comprising a paging queue empty indication indicating that no pages are pending based on a result of the determining whether paging information for the one or more UEs is pending.

25. The apparatus of claim 24, further comprising:
means for determining a resource for the paging queue empty indication based on a mask function or a hash function of identifiers associated with the one or more UEs.

26. The apparatus of claim 24, wherein the paging queue empty indication is indicated in a physical channel of the downlink transmission, in a physical frame format indication channel (PFFICH), in a physical micro sleep indicator channel (PMSICH), in a physical broadcast channel (PBCH), in a radio resource control (RRC) message, in a message masked with a radio network temporary identity (RNTI), or any combination thereof.

27. The apparatus of claim 19, wherein the downlink transmission comprises a reference signal, a cell-specific reference signal (CRS), a discovery reference signal (DRS), or any combination thereof.

28. A non-transitory computer-readable medium storing code for wireless communication, the code comprising instructions executable by a processor to:
configure, by a base station serving one or more user equipments (UEs) on a cell via a channel of a shared frequency band, a first UE for discontinuous reception (DRX) operation according to a DRX configuration including at least a first paging interval and a second paging interval for a set of paging opportunities;
determine whether paging information for the first UE is pending;
determine an ability to transmit a page to the first UE during the first paging interval based at least in part on a channel access procedure for the channel; and
transmit the page on the cell based on the determining the ability to transmit the page to the first UE.

29. The non-transitory computer-readable medium of claim 28, wherein the instructions are further executable to:
transmit the page during the second paging interval based on the channel access procedure determining that the channel is busy during the first paging interval.

30. The non-transitory computer-readable medium of claim 29, wherein the instructions are further executable to:
detect an interference level of the channel; and
adapt at least one of a number of paging intervals or a length of paging interval gaps of the DRX configuration for the first UE based on the detected interference level.

* * * * *